US008555739B2

(12) United States Patent
Ieda et al.

(10) Patent No.: US 8,555,739 B2
(45) Date of Patent: *Oct. 15, 2013

(54) SHIFT CONTROL DEVICE OF SADDLE-RIDE-TYPE VEHICLE

(75) Inventors: Yoshihisa Ieda, Wako (JP); Akihiko Tomoda, Wako (JP); Osamu Emizu, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 318 days.

This patent is subject to a terminal disclaimer.

(21) Appl. No.: 13/048,256

(22) Filed: Mar. 15, 2011

(65) Prior Publication Data

US 2011/0226080 A1  Sep. 22, 2011

(30) Foreign Application Priority Data

Mar. 18, 2010 (JP) .................................. 2010-062669

(51) Int. Cl.
*B60K 20/00* (2006.01)
*G05G 9/00* (2006.01)
*G05G 5/08* (2006.01)

(52) U.S. Cl.
USPC .................. 74/335; 74/473.16; 74/473.26

(58) Field of Classification Search
USPC ................ 74/473.1, 473.16, 473.21–473.26, 74/473.29, 473.3, 473.36, 473.37, 478, 74/512, 337.5, 335, 343

See application file for complete search history.

(56) References Cited

U.S. PATENT DOCUMENTS

| | | | | |
|---|---|---|---|---|
| 4,093,264 A * | 6/1978 | Ishihara et al. | ............... | 280/296 |
| 4,510,820 A * | 4/1985 | Tsuboi | ....................... | 74/473.16 |
| 6,619,450 B2 * | 9/2003 | Ota et al. | ..................... | 192/3.56 |
| 6,880,420 B2 * | 4/2005 | Shen | .............................. | 74/335 |
| 7,891,262 B2 * | 2/2011 | Hayakawa et al. | .......... | 74/337.5 |
| 8,150,587 B2 * | 4/2012 | Tomoda et al. | ................. | 701/64 |
| 8,387,477 B2 * | 3/2013 | Ieda et al. | ........................ | 74/335 |
| 2005/0229894 A1 * | 10/2005 | Okano et al. | ............... | 123/197.1 |
| 2007/0026994 A1 * | 2/2007 | Matsuda et al. | ................ | 477/92 |
| 2007/0245841 A1 * | 10/2007 | Kitai et al. | ...................... | 74/335 |
| 2008/0229854 A1 * | 9/2008 | Mizuno et al. | .................. | 74/335 |
| 2010/0050805 A1 * | 3/2010 | Hayakawa et al. | ......... | 74/473.28 |
| 2010/0077884 A1 * | 4/2010 | Ono et al. | .................. | 74/473.36 |
| 2010/0242655 A1 * | 9/2010 | Ieda et al. | .................... | 74/473.1 |

FOREIGN PATENT DOCUMENTS

JP  2009-209970 A  9/2009

* cited by examiner

*Primary Examiner* — Troy Chambers
*Assistant Examiner* — Jake Cook
(74) *Attorney, Agent, or Firm* — Westerman, Hattori, Daniels & Adrian, LLP

(57) ABSTRACT

A shift control device in a saddle-ride-type vehicle includes a lost motion mechanism and a locking mechanism. The lost motion mechanism is disposed between a shift spindle and a shift drum and engages a shifter-side rotary member on a shift spindle side and a drum-side rotary member on a shift drum side, in a relatively rotatable manner while accumulating a force. The locking mechanism is engaged with the shifter-side rotary member and the drum-side rotary member, respectively, so as to restrict the rotation of the shifter-side rotary member and the rotation of the drum-side rotary member, individually.

7 Claims, 18 Drawing Sheets

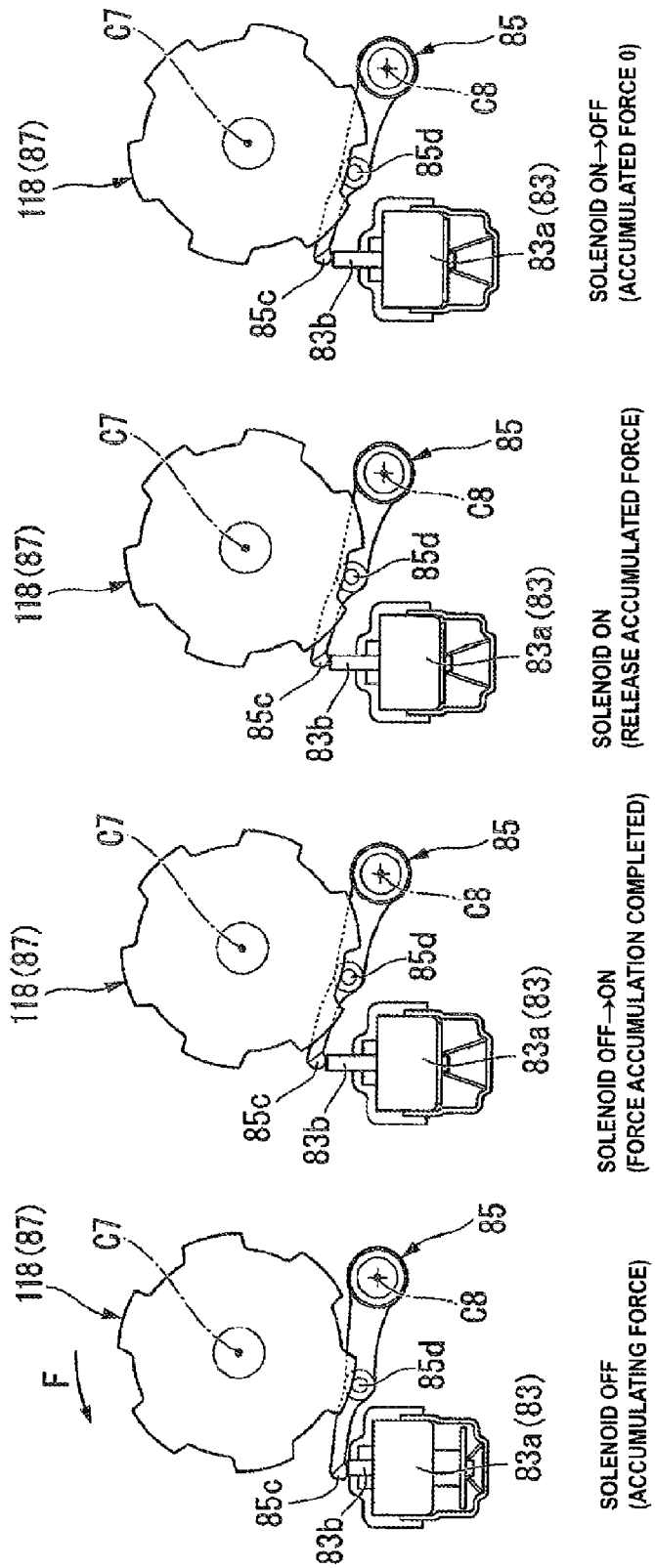

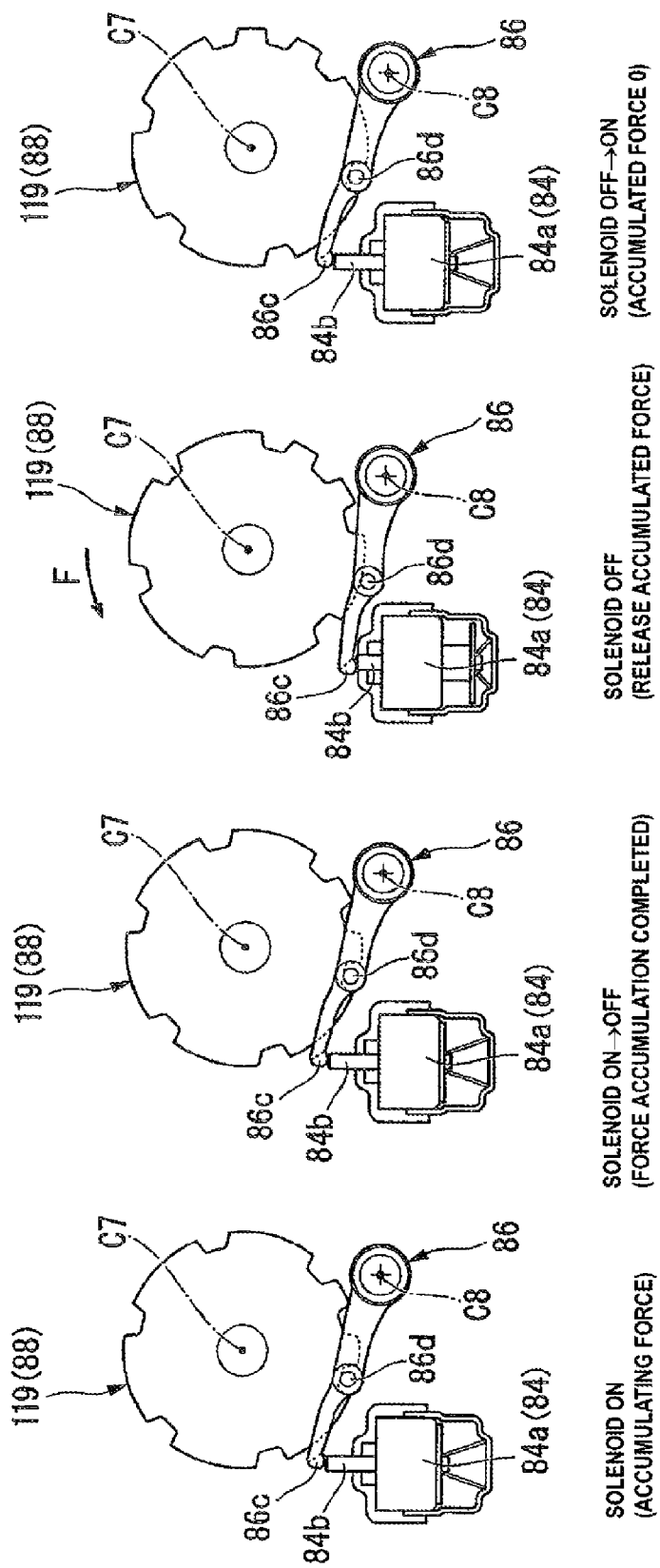

SHIFT CONTROL DEVICE OF SADDLE-RIDE-TYPE VEHICLE

BACKGROUND OF THE INVENTION

The present invention relates to a shift control device of a saddle-ride-type vehicle, such as a motorcycle.

JP-A-2009-209970 discloses a shift control device of a motorcycle in which, although the engagement and disengagement of a clutch is performed by an actuator, a shift manipulation of a transmission is performed in such a manner that a shift drum is rotated by a manipulation force which a rider imparts to a shift pedal.

SUMMARY OF THE INVENTION

In the above-mentioned prior art, in addition to interlocking of the shift pedal manipulation and a control of a clutch, there has been a demand for the enhancement of reliability of a shift change and feeling of a shift manipulation with the simple and compact layout.

A feature of the present invention is the enhancement of the reliability of a shift change and the feeling of a shift manipulation with a simple and compact layout, in a shift control device of a saddle-ride-type vehicle in which, while the engagement and disengagement of a clutch is automatically performed by an actuator, and a shift manipulation of a transmission is performed by a rider's manipulation.

To overcome the above-mentioned drawbacks, the shift control device of a saddle-ride-type vehicle, includes an engine, and a transmission, wherein the transmission includes a shift spindle, which is rotated due to an external force for shifting, and a shift drum which is intermittently rotated corresponding to the rotation of the shift spindle so as to operate a shift fork thereby performing the selection of a shift gear. The shift control device also includes a lost motion mechanism which is disposed between the shift spindle and the shift drum and engages an upstream-side rotary member on a shift spindle side and a downstream-side rotary member on a shift drum side with each other in a relatively rotatable manner while accumulating a force, and a locking mechanism which is engaged with the upstream-side rotary member and the downstream-side rotary member, respectively, so as to restrict the rotation of the upstream-side rotary member and the rotation of the downstream-side rotary member, individually.

Here, the saddle-ride-type vehicle includes vehicles in general where a rider rides on a vehicle body in a straddling manner That is, the saddle-ride-type vehicle includes not only a motorcycle (including a bicycle provided with a prime mover and a scooter-type vehicle) but also a three-wheeled (also including a vehicle which has two front wheels and one rear wheel besides a vehicle which has one front wheel and two rear wheels) or a four-wheeled vehicle.

Another feature of the shift control device is that the locking mechanism includes:

an upstream-side solenoid which allows the rotation of the upstream-side rotary member until a rotation amount of the shift spindle reaches a predetermined amount by which a rotation amount of the shift drum, necessary for changing a shift gear position of the transmission, can be ensured and restricts the rotation of the upstream-side rotary member when the rotation amount of the shift spindle becomes the predetermined amount; and a downstream-side solenoid which restricts the rotation of the downstream-side rotary member in a state where the rotation of the upstream-side rotary member is allowed, and allows the rotation of the downstream-side rotary member when the rotation of the upstream-side rotary member is restricted.

Another feature of the shift control deice is that the respective rotary members are disposed coaxially with each other, and the lost motion mechanism includes, a first guide member which is engaged with the respective rotary members in an integrally rotatable manner, when the respective rotary members are rotated in a forward direction; a second guide member which is engaged with the respective rotary members in an integrally rotatable manner, when the respective rotary members are rotated in a backward direction; and a lost motion spring which is held between the respective guide members, biases the first guide member in the backward rotational direction, and biases the second guide member in the forward rotational direction.

Still another feature of the shift control device is that the shift spindle and the shift drum are disposed in the lateral direction, and the respective solenoids are located in front of a straight line (T1) which connects respective axes (C6, C7) of the shift spindle and the shift drum as viewed in a side view.

Also, another feature of the shift control device is that the respective solenoids are housed in one case, and a pivot portion of a shift spindle angle sensor is mounted on the case in a projecting manner.

By restricting the rotation of one of the respective rotary members and, at the same time, allowing the rotation of the other of the respective rotary members by the locking mechanism, a shift manipulation force is accumulated by causing the relative rotation between the respective rotary members, and the shift drum is rotated by releasing this force at predetermined timing and hence, shift start timing can be surely controlled and, at the same time, it is possible to surely make an accumulated force act until the completion of shifting.

It is also possible to allow the lost motion mechanism to accumulate a shift manipulation force with the simple structure that the rotations of the respective rotary members are allowed or restricted by the respective solenoids, and this force is released after completion of rotation of the upstream-side rotary member so that the downstream-side rotary member and the shift drum can be rotated whereby the reliability of a shift change and feeling of shift manipulation can be enhanced.

Additionally, a rotational force can be transmitted to the downstream-side rotary member in order of the first guide member, the lost motion spring and the second guide member during the forward rotation of the upstream-side rotary member, while the rotational force is transmitted to the down-stream-side rotary member in order of the second guide member, the lost motion spring and the first guide member during the backward rotation of the upstream-side rotary member. Here, when the rotation of the downstream-side rotary member is restricted, during the forward rotation of the upstream-side rotary member, only the first guide member is rotated so that a force which rotates the second guide member and the downstream-side rotary member in the forward direction is accumulated in the lost motion spring, while during the backward rotation of the upstream-side rotary member, only the second guide member is rotated so that a force which rotates the first guide member and the downstream-side rotary member in the backward direction is accumulated in the lost motion spring. Then, by releasing the rotation restriction of the downstream-side rotary member at predetermined timing, the downstream-side rotary member and the shift drum are rotated so that a shift change can be performed. In this manner, it is possible to realize the accumulation means which accumulates a rotational force of the shift drum with the simple constitution.

Further, by locating the respective solenoids in the space which has a relatively sufficient space for layout in front of the shift spindle and the shift drum, it is possible to provide a compact engine layout by which it is unnecessary to additionally ensure spaces for arranging the respective solenoids.

It is also possible to constitute the shift spindle angle sensor by using a small number of parts.

BRIEF DESCRIPTION OF THE DRAWINGS

FIG. 10(*b*) is a left side view showing the structure corresponding to FIG. 9 in a shift-down manipulation;

FIG. 12(*b*) is a left side view of a rear drum stopper;

FIG. 17(*a*) to FIG. 17(*d*) are explanatory views showing an operation of the shifter-side locking mechanism, in order, from FIG. 17(*a*) to FIG. 17(*d*); and FIG. 18(*a*) to FIG. 18(*d*) are explanatory views showing an operation of the drum-side locking mechanism, in order, from FIG. 18(*a*) to FIG. 18(*d*).

DETAILED DESCRIPTION OF THE INVENTION

Figure 1:
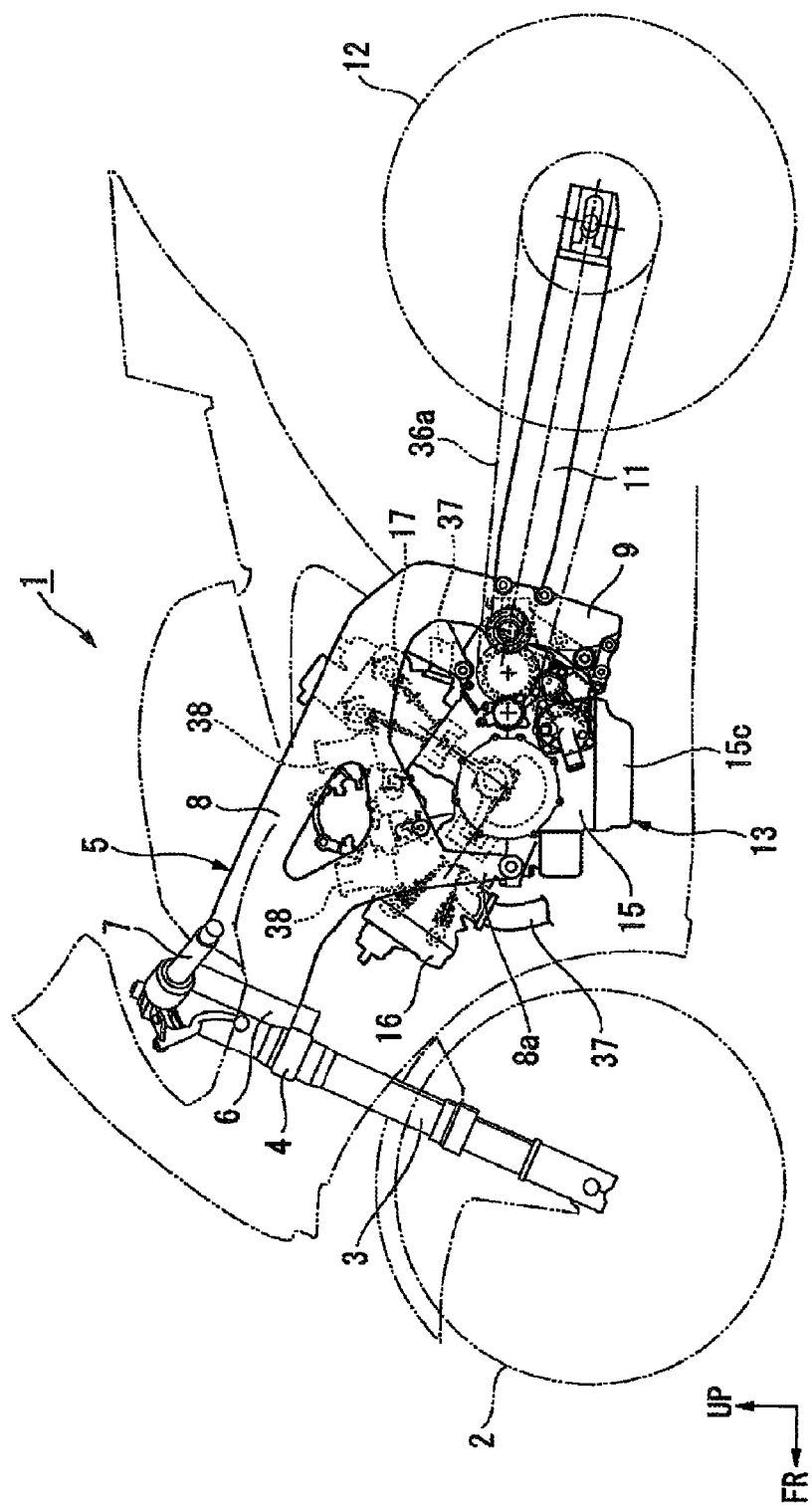
FIG. 1 is a left side elevational view of a motorcycle according to an embodiment of the present invention.

Hereinafter, an embodiment of the present invention is explained in conjunction with drawings. In the explanation made hereinafter, directions of front and rear, left and right are equal to the directions of a vehicle unless otherwise specified. Further, in the drawings, an arrow FR indicates a frontward direction as viewed from the vehicle, an arrow LH indicates a leftward direction as viewed from the vehicle, and an arrow UP indicates an upward direction as viewed from the vehicle respectively.

In a motorcycle 1 shown in FIG. 1, a front wheel 2 of the motorcycle 1 is rotatably and pivotally supported on lower end portions of a pair of left and right front forks 3, and upper portions of the respective front forks 3 are pivotally supported on a head pipe 6 disposed on a front end of a vehicle body frame 5 by way of a steering stem 4 in a steerable manner. Upper end portions of the left and right front forks 3 project from the steering stem 4 in the upward direction, and left and right handle bars 7 are mounted on the projecting portions.

In the vehicle-body frame 5, left and right main tubes 8 extend obliquely in the downward and rearward direction behind the head pipe 6, and upper end portions of left and right pivot frames 9 are respectively connected to rear end portions of the left and right main tubes 8. A front end portion of a swing arm 11 is pivotally and swingably supported on the left and right pivot frames 9, and a rear wheel 12 is rotatably and pivotally supported on a rear end portion of the swing arm 11. An engine 13 is suspended from an inner side of the vehicle body frame 5, and the engine 13 and the rear wheel 12 are interconnected with each other such that power can be transmitted by way of a chain-type power transmission mechanism, for example.

Figure 2:
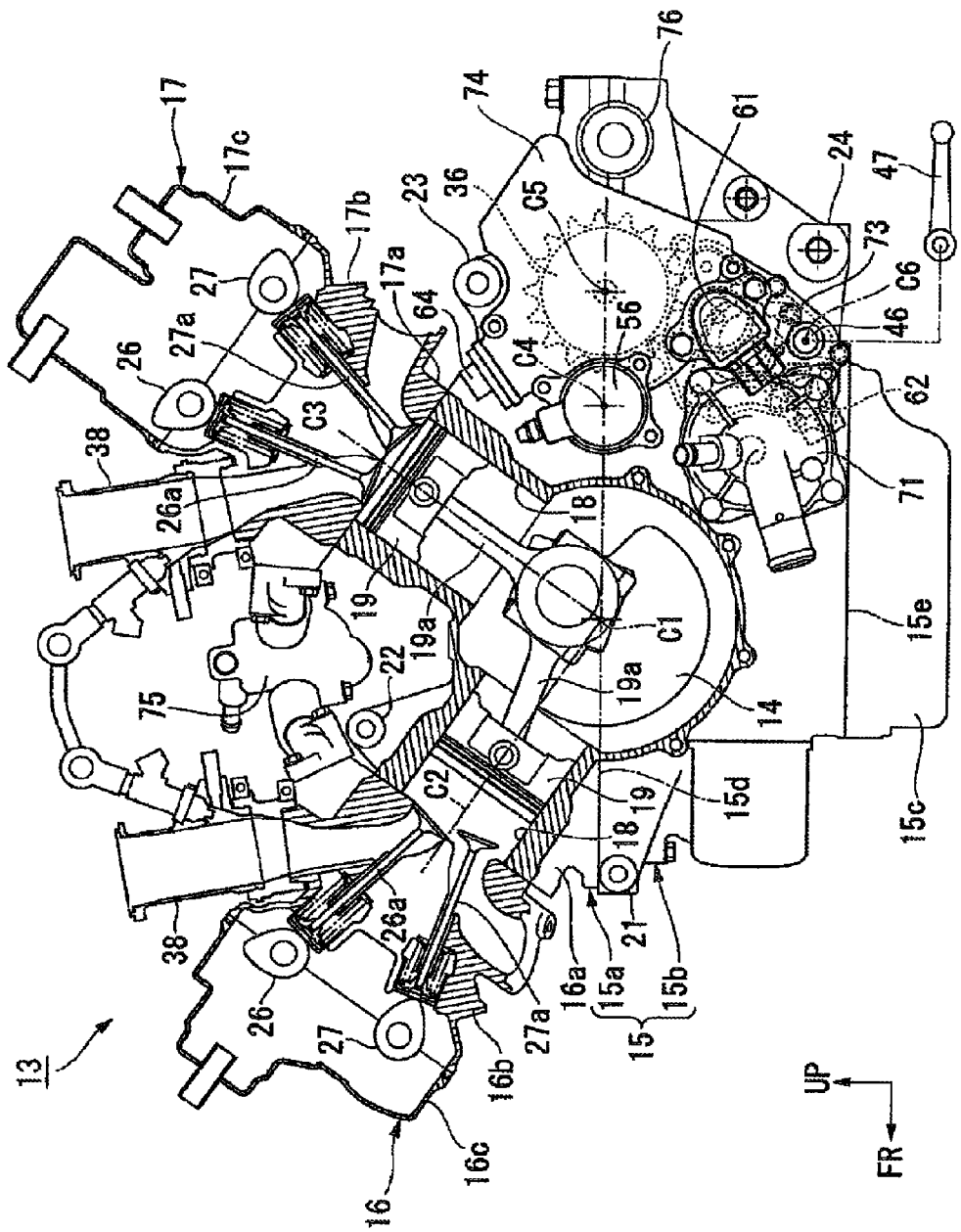
FIG. 2 is a left side elevational view of an engine of the motorcycle.

To explain the embodiment also in conjunction with FIG. 2, the engine 13 is a water-cooled 4-stroke V-type 4-cylinder engine in which a center axis of rotation of a crankshaft 14 (crank axis) C1 extends in the lateral direction (vehicle widthwise direction), for example. A front cylinder 16 which is raised in the oblique frontward and upward direction and a rear cylinder 17 which is raised in the oblique rearward and upward direction are formed on a front upper portion of a crankcase 15 of the engine 13. Here, axes which respectively extend in the raised directions of the front and rear cylinders (front and rear banks) 16, 17 (cylinder axis) are indicated by symbols C2, C3 in the drawing, respectively.

The front and rear cylinders 16, 17 are respectively constituted by stacking a cylinder body 16*a*, 17*a*, a cylinder head 16*b*, 17*b* and a head cover 16*c*, 17*c*, in order, from a crankcase 15 side. Here, the respective cylinder bodies 16*a*, 17*a* are integrally formed with the crankcase 15. A cylinder bore 18 which corresponds to each cylinder is formed in the inside of the respective cylinder bodies 16*a*, 17*a*, and a piston 19 is fitted in each cylinder bore 18 in a reciprocating manner. Each piston 19 is connected to a crank pin of the crankshaft 14 by way of a connecting rod 19*a* so that the reciprocating movement of each respective piston 19 is converted into the rotational movement of the crankshaft 14.

The engine 13 is fixedly supported on the vehicle body frame 5 in such a manner that a front support portion 21 which constitutes a front end of the crankcase 15 of the engine 13 is fixed to a lower end portion of an engine hanger 8*a* which extends downwardly from a front portion of the main tube 8 by fastening, and an upper support portion 22 which constitutes an upper portion (a rear portion of the front cylinder 16) of the crankcase 15 is fixed to a rear side of a proximal end portion of the engine hanger 8*a* by fastening, and a rear upper support portion 23 and a rear lower support portion 24 which constitute a rear end of the crankcase 15 are respectively fixed to upper and lower sides of a front portion of the pivot frame 9 by fastening.

The engine 13 is configured such that a transmission (see FIG. 3) 25 is integrally mounted on a rear portion of the engine 13, and a rear portion of the crankcase 15 also functions as a transmission case. The crankcase 15 is, for example, divided into upper and lower case bodies 15*a*, 15*b* using a substantially horizontal dividing plane 15*d* which is disposed parallel to the crank axis C1 as a boundary. An oil pan 15*c* is mounted on a lower portion of the crankcase 15 (lower case body 15*b*). Here, a substantially horizontal plane (a split face between the oil pan 15*c* and the crankcase 15) formed on a lower end of the crankcase 15 (lower case body 15*b*) is indicated by symbol 15*e* in FIG. 2.

Figure 3:
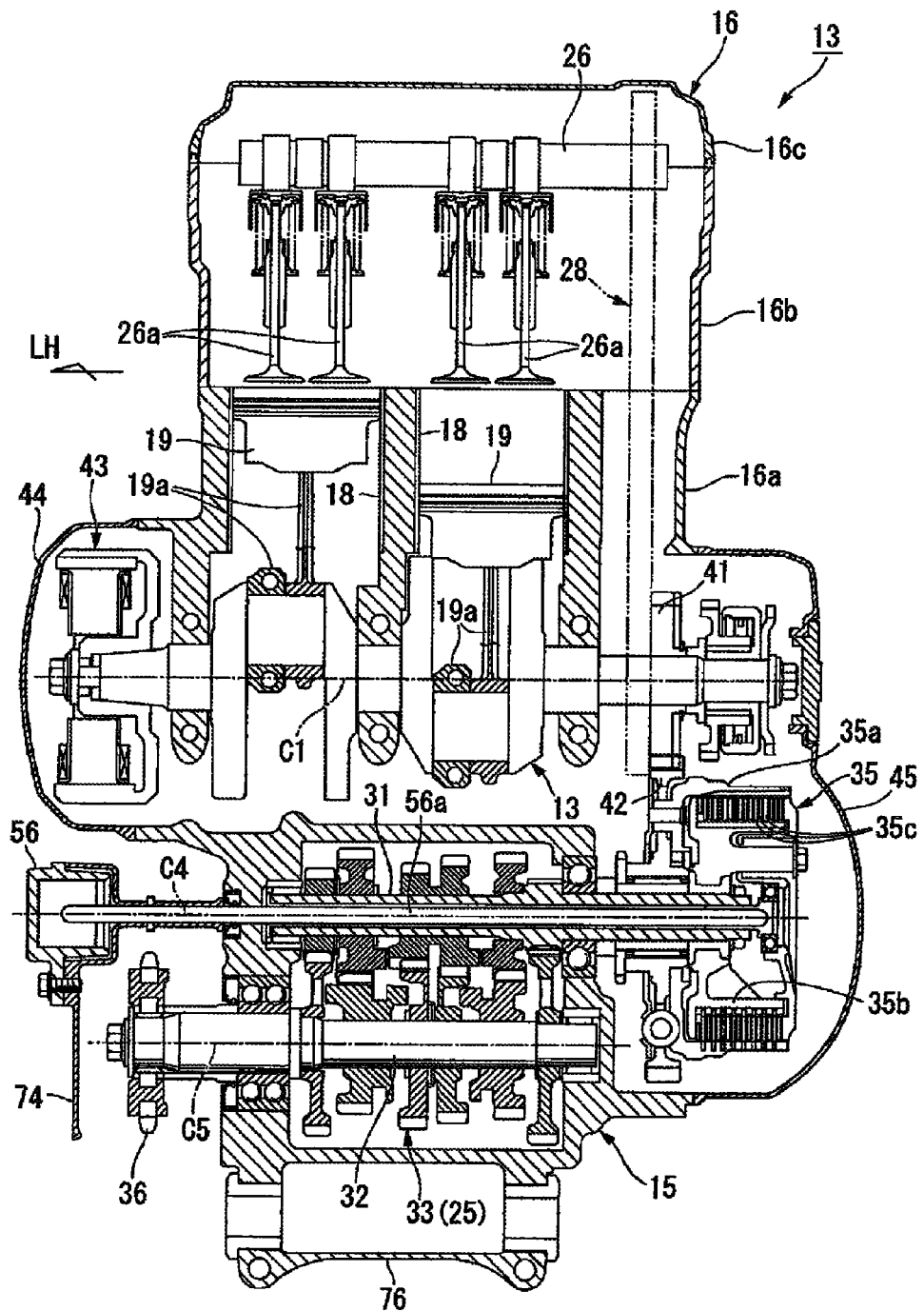
FIG. 3 is a planar cross-sectional view taken along a crank axis of the engine.

To explain the embodiment also in conjunction with FIG. 2 and FIG. 3, an intake-side camshaft 26 and an exhaust-side camshaft 27 are located in the inside of the respective cylinder heads 16b, 17b respectively, and these camshafts 26, 27 are rotated in an interlocking manner with the crankshaft 14 by way of a gear-type or chain-type cam drive mechanism 28. Due to the rotational driving of the respective cam shafts 26, 27, intake and exhaust valves 26a, 27a which are held in the inside of the respective cylinder heads 16b, 17b in a reciprocating manner are operated respectively.

Behind the crankshaft 14, a main shaft 31 and a counter shaft 32 of the transmission 25 are disposed parallel to each other in the longitudinal direction. The respective shafts 31, 32 include center axes of rotation (main axis and counter axis) C4, C5 which are disposed parallel to the crank axis C1. The respective shafts 14, 31, 32 are disposed such that, for example, the respective axes C1, C4, C5 are positioned on the dividing plane 15d.

The rotational power of the crankshaft 14 is outputted to a drive sprocket wheel 36 which is located on a left side of a rear portion of the crankcase 15 by way of a clutch 35 which is located in the inside of a right side of the crankcase 15 and the transmission 25 which is arranged in the inside of a rear portion of the crankcase 15, and the rotational power is transmitted to the rear wheel 12 from the drive sprocket wheel 36 by way of a drive chain 36a and the like.

Two exhaust pipes 37 which correspond to the respective cylinders are connected to a front side of the cylinder heads 16b of the front cylinders 16, and two exhaust pipes 37 which correspond to the respective cylinders are connected to a rear side of the cylinder heads 17b of the rear cylinders 17 respectively in the same manner. Further, two throttle bodies 38 which correspond to the respective cylinders are connected to a rear side of the cylinder heads 16b of the front cylinders 16, and two throttle bodies 38 which correspond to the respective cylinders are connected to a front side of the cylinder heads 17b of the rear cylinders 17 respectively in the same manner. In the drawing, numeral 75 indicates a thermostat which is arranged between the front and rear cylinders 16, 17, and numeral 76 indicates a pivot support portion which is mounted on a rear end portion of the crankcase 15 and supports a front end portion of the swing arm 11 together with the pivot frame 9.

To explain the embodiment in conjunction with FIG. 3, a primary drive gear 41 is coaxially mounted on a right side portion of the crankshaft 14 in an integrally rotatable manner, and the primary drive gear 41 is meshed with a primary driven gear 42 which is coaxially arranged on a right side portion of the main shaft 31. A generator 43 is coaxially arranged on a left end portion of the crankshaft 14.

The clutch 35 which a rider can manipulate is coaxially arranged on a right end portion of the main shaft 31. The clutch 35 is a well-known wet-type multiple disc clutch. The clutch 35 includes: a clutch outer 35a which has a bottomed cylindrical shape opened rightwardly and is supported on the main shaft 31 in a rotatable manner relative to the main shaft 31, a clutch inner 35b which is supported on the main shaft 31 inside the clutch outer 35a in a non-rotatable manner relative to the main shaft 31, and a plurality of clutch plates 35c which are located between the clutch inner 35b and the clutch outer 35a in a stacked manner and allow or inhibit the power transmission between the clutch inner 35b and the clutch outer 35a. The primary driven gear 42 is mounted on a left side portion of the clutch outer 35a in an integrally rotatable manner. In the drawing, numerals 44, 45 respectively indicate left and right case covers which are mounted on left and right side portions of the crankcase 15 respectively.

The transmission 25 is mainly constituted of the main shaft 31 and the counter shaft 32 which are arranged parallel to the crankshaft 14, and a group of shift gears 33 which extends between and is supported on both shafts 31, 32. The rotational power of the crankshaft 14 is transmitted to the counter shaft 32 from the main shaft 31 by way of an arbitrary gear pair of the group of shift gears 33. The drive sprocket wheel 36 is mounted on the left end portion of the counter shaft 32 which projects toward a left side of the rear portion of the crankcase 15 in an integrally rotatable manner.

The group of shift gears 33 includes gears supported on both shafts 31, 32 the number of which corresponds to the number of shift positions. The transmission 25 is a constant-mesh transmission in which corresponding gears which form each pair in the group of shift gears 33 are always meshed with each other between both shafts 31, 32. The respective gears supported on both shafts 31, 32 are classified into free gears which are rotatable relative to the shaft corresponding to the free gears and slide gears (shifters) which are fitted on the shaft corresponding to the slide gears by spline fitting. A dog which projects in the axial direction is formed on either one of the free gears and the slide gears, and a slot which is formed by indentation in the axial direction to be engaged with the dog is formed on the other of the free gears and the slide gears.

Figure 4:
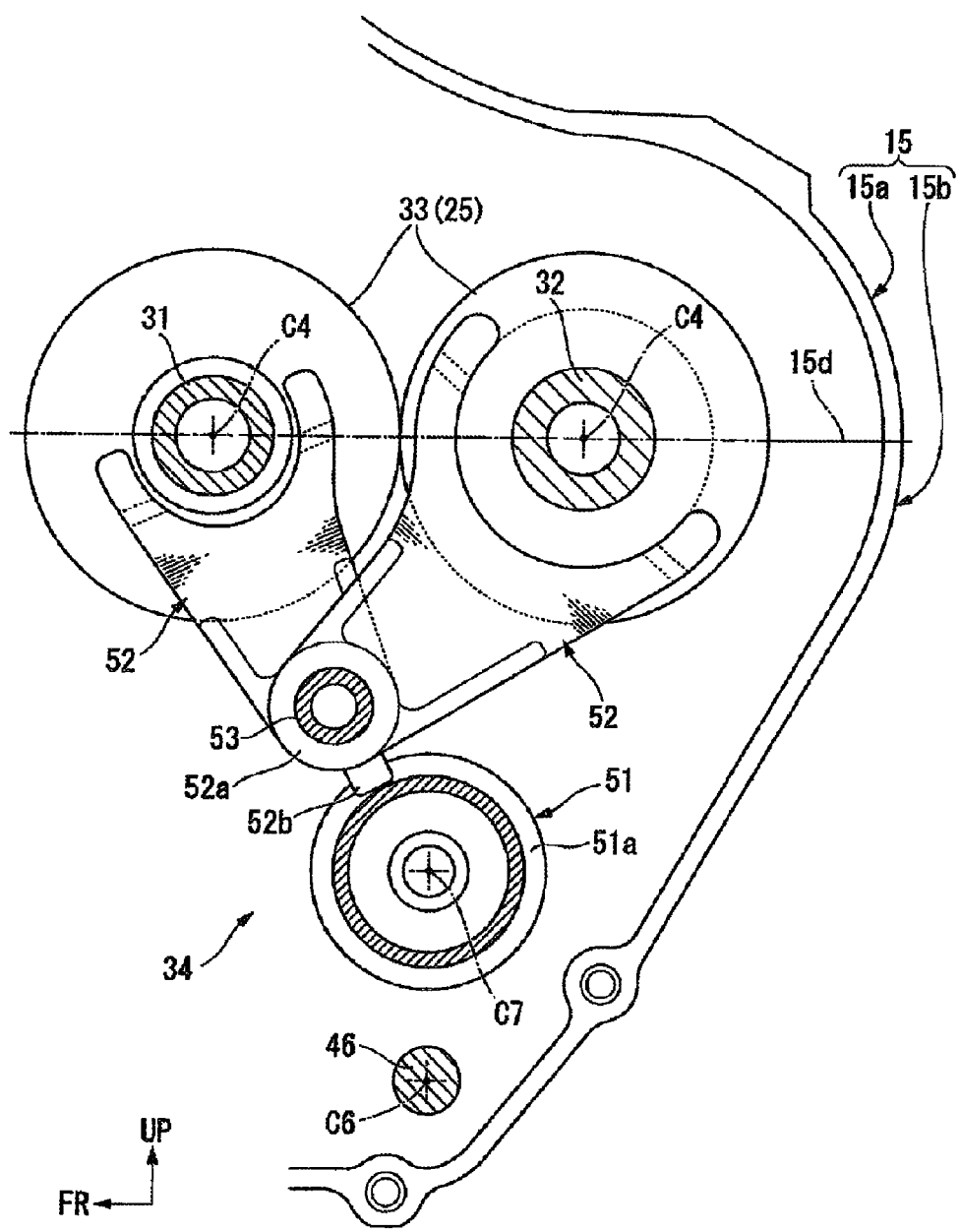
FIG. 4 is a left side view with a partial cross section of a transmission disposed on a rear portion of the engine.

To explain this embodiment also in conjunction with FIG. 2, FIG. 4 and FIG. 5, a change mechanism which changes over a shift gear pair of the transmission 25 is disposed below the transmission 25. In the change mechanism 34, due to the rotation of a hollow cylindrical shift drum 51 arranged parallel to both shafts 31, 32, a plurality of shift forks 52 are operated corresponding to a pattern of a lead groove 51a formed on an outer periphery of the shift drum 51 so that, among the group of shift gears 33, a gear pair used for the power transmission between both shafts 31, 32 is changed over. A shift fork shaft 53 which is parallel to the shift drum 51 is disposed obliquely in front of and above the shift drum 51, and a shift spindle 46 which is parallel to the shift drum 51 is disposed below the shift drum 51. In the drawings, symbols C6, C7 indicate a rotational center axis (axis) of the shift spindle 46 and a rotational center axis (axis) of the shift drum 51 along the lateral direction.

Each shift fork 52 forms a fork pin 52b which is engaged with the lead groove 51a of the shift drum 51 on a base portion 52a thereof in which the shift fork shaft 53 is inserted, wherein the fork pin 52b projects obliquely in the rearward and downward direction. When the shift spindle 46 and a shift arm 54 which is fixed to the shift spindle 46 are rotated, the shift drum 51 is rotated by way of a power transmission mechanism (manipulation power transmission means) 81 and the like described later so that the shift fork 52 is moved in the axial direction of the shift fork shaft 53 corresponding to the pattern of the lead groove 51a whereby the predetermined slide gear of the group of shift gears 33 is slid thus changing over a shift position.

The shift spindle 46 projects to the outside of the crankcase 15 for manipulating the change mechanism 34, and a shift pedal 47 is connected to a projecting portion of the shift spindle 46 which projects to the outside (left side) of the crankcase 15 directly or by way of a predetermined link mechanism or the like. The shift pedal 47 is arranged in the vertically swingable manner such that a front side of the shift pedal 47 constitutes a swing proximal-end side and a rear side of the shift pedal 47 constitutes a swing distal-end side (a manipulation end side operated by a foot of a rider).

Here, the motorcycle 1 provides, besides traveling in a usual manual mode where a rider performs both a manipulation of the clutch 35 and a manipulation of the transmission 25, traveling in a semiautomatic mode where a rider performs only a shift manipulation (a manipulation of the shift pedal 47) of the transmission 25, and an engagement/disengagement manipulation of the clutch 35 is automatically performed under an electric control in response to a manipulation of the shift pedal 47.

Figure 5:
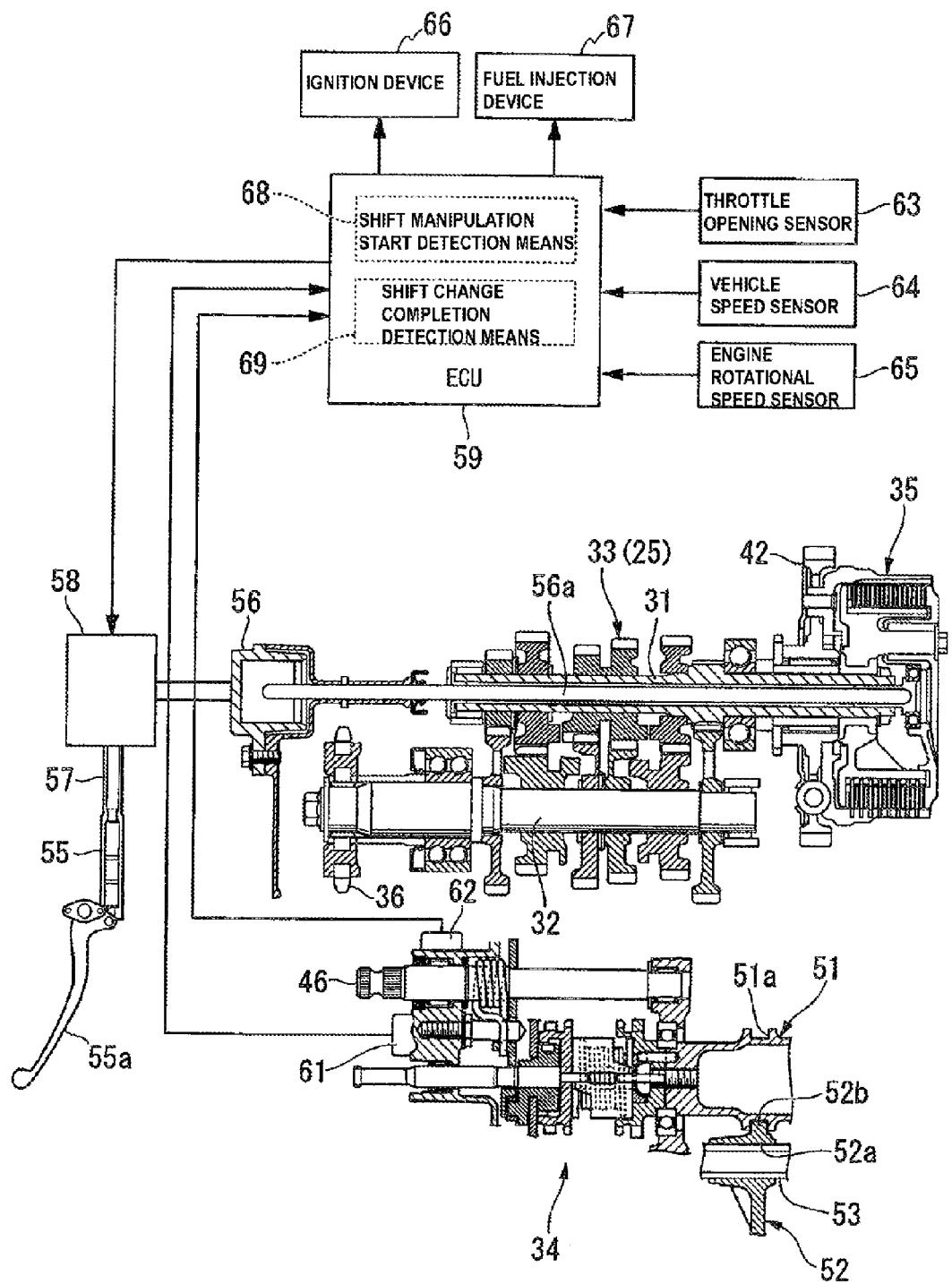
FIG. 5 is a schematic view of a shift control device of the motorcycle.

To explain this embodiment in conjunction with FIG. 5, the motorcycle 1 includes a master cylinder 55 which is mounted on a left handle lever 7, for example, and generates a liquid pressure due to a manipulation of a clutch lever 55a, a slave cylinder 56 which is mounted on a left side of a rear portion of the crankcase 15 and is operated by receiving the liquid pressure from the master cylinder 55, and a liquid pressure pipe 57 which extends between the respective cylinders 55, 56.

The slave cylinder 56 is coaxially arranged with the main shaft 31, and is operated when a liquid pressure is supplied to the slave cylinder 56 from the master cylinder 55. When the slave cylinder 56 is operated, the clutch 35 is operated by way of a push rod 56a which penetrates the inside of the main shaft 31 so that the clutch 35 is brought into a disengagement state from an engagement state. On the other hand, when the supply of the liquid pressure to the slave cylinder 56 is stopped, the slave cylinder 56 is returned to a state before the above-mentioned operation and, at the same time, the clutch 35 is returned to an engagement state due to an action of a clutch spring thereof.

An actuator 58 which automatically performs the disengagement of the clutch 35 in a semiautomatic mode is located on an intermediate portion of the liquid pressure pipe 57. The actuator 58 includes a drive source such as an electric motor not shown in the drawing, and a liquid pressure control for engaging or disengaging the clutch 35 is performed by controlling an operation of the actuator 58 using an ECU 59.

To the ECU 59, detection information from a gear position sensor 61 which detects a shift position based on a rotation angle of the shift drum 51, detection information from a shift spindle angle sensor 62 which detects a rotation angle of the shift spindle 46, and various vehicle state detection information from a throttle opening sensor 63, a vehicle speed sensor 64, an engine rotational speed sensor 65 and the like are inputted. Based on the respective information, an operation control of the actuator 58 and an operation control of an ignition device 66 and a fuel injection device 67 are performed.

Further, the ECU 59 includes a shift manipulation start detection means 68 which detects starting of a shift manipulation by a rider, and a shift change completion detection means 69 which detects the completion of the shift operation by the shift manipulation. Accordingly, in the semiautomatic mode, the ECU 59 performs the operation control of the actuator 58 and hence, the engagement and the disengagement of the clutch 35 are performed automatically in response to the shift manipulation.

Figure 6:
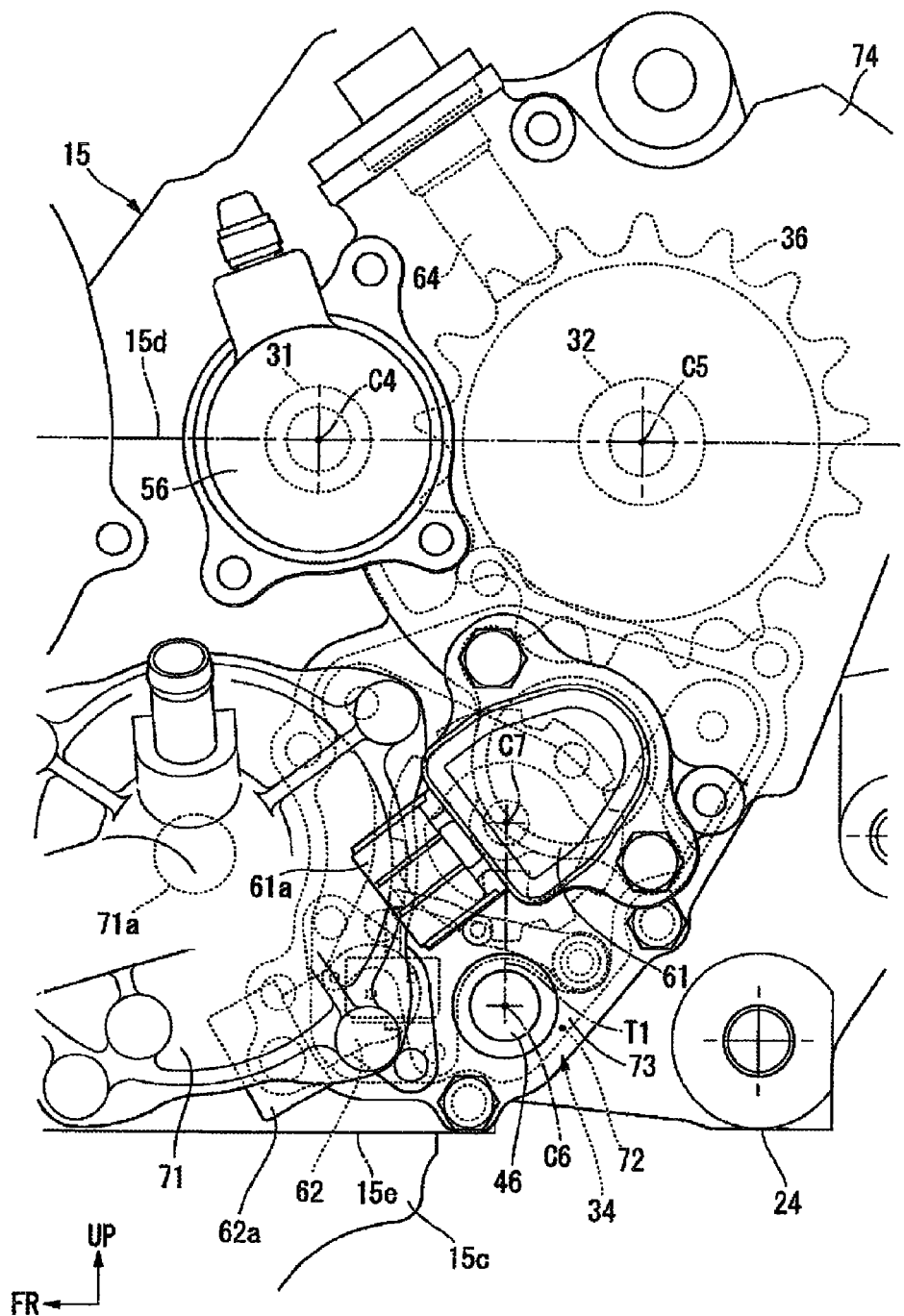
FIG. 6 is a left side view of a part of the engine.
Figure 7:
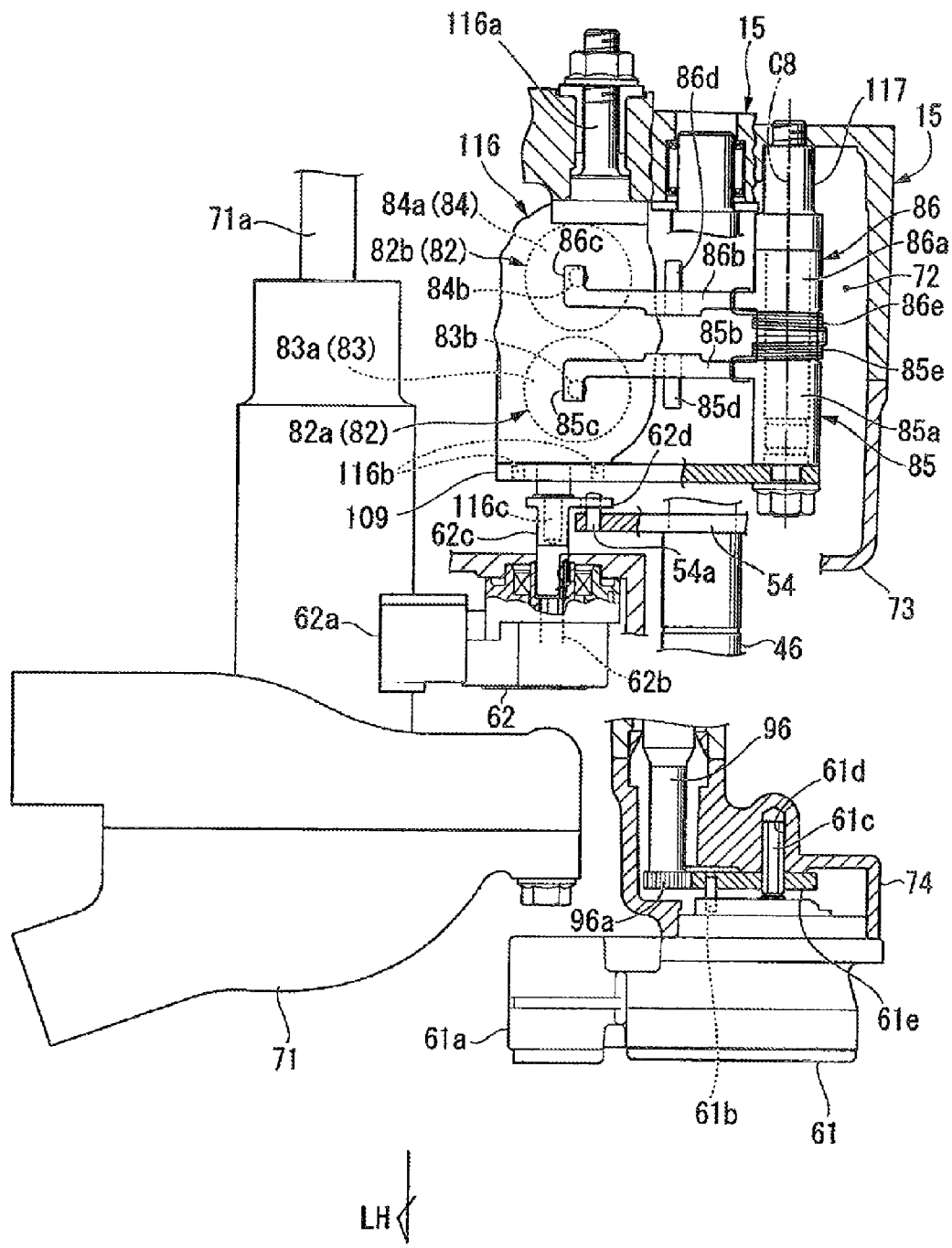
FIG. 7 is a top plan view with a partial in cross section of a part of the engine.

To explain this embodiment in conjunction with FIG. 6 and FIG. 7, a water pump 71 having an approximately circular shape as viewed in a side view and including a drive shaft 71a which extends in the lateral direction is located on a left lower rear side of the crankcase 15. On the left lower rear side of the crankcase 15 and behind the water pump 71, a mechanism housing chamber 72 which opens leftwardly (outwardly) is provided. On a left opening of the mechanism housing chamber 72, a left rear cover 73 which closes the left opening is mounted. On a front outer side of the mechanism housing chamber 72 and the left rear cover 73, the water pump 71 is disposed such that a rear portion of the water pump 71 overlaps with the mechanism housing chamber 72 and the left rear cover 73 as viewed in a side view.

A drive sprocket wheel 36 and a drive sprocket wheel cover 74 which covers an outer side of the drive sprocket wheel 36 are located above the mechanism housing chamber 72. In the inside of a lower portion of the drive sprocket wheel cover 74, the mechanism housing chamber 72 and the left rear cover 73 are arranged such that an upper portions of the mechanism housing chamber 72 and the left rear cover 73 overlap with each other as viewed in a side view. In the inside of a lower end portion of the drive sprocket wheel 36, an upper end portion of the mechanism housing chamber 72 and an upper end portion of the left rear cover 73 are disposed so as to overlap with each other as viewed in a side view.

The slave cylinder 56 is mounted on an outer side of a front end portion of the drive sprocket wheel cover 74, and the gear position sensor 61 is mounted on an outer side of a lower end portion of the drive sprocket wheel cover 74. The vehicle speed sensor 64 which detects a vehicle speed based on a rotational speed of the drive sprocket wheel 36 is mounted on an outer side of a front portion of an upper end of the drive sprocket wheel cover 74.

A coupler 61a into which a harness-side connector not shown in the drawing can be inserted is formed on a lower side of a front portion of the gear position sensor 61 in a state where the coupler 61a projects obliquely in the frontward and downward direction. The coupler 61a is arranged outside a rear end portion of the water pump 71 such that the coupler 61a overlaps with the water pump 71 as viewed in a side view.

A shift spindle angle sensor 62 which detects a rotation angle of the shift spindle 46 is mounted on an outer side of a front lower portion of the left rear cover 73. A coupler 62a into which a harness-side connector not shown in the drawing can be inserted is formed on a lower side of a front portion of the shift spindle angle sensor 62 in a state where the coupler 62a projects obliquely in the frontward and downward direction. The water pump 71 is arranged outside the shift spindle angle sensor 62 such that a rear lower portion of the water pump 71 overlaps with the shift spindle angle sensor 62 as viewed in a side view.

Figure 8:
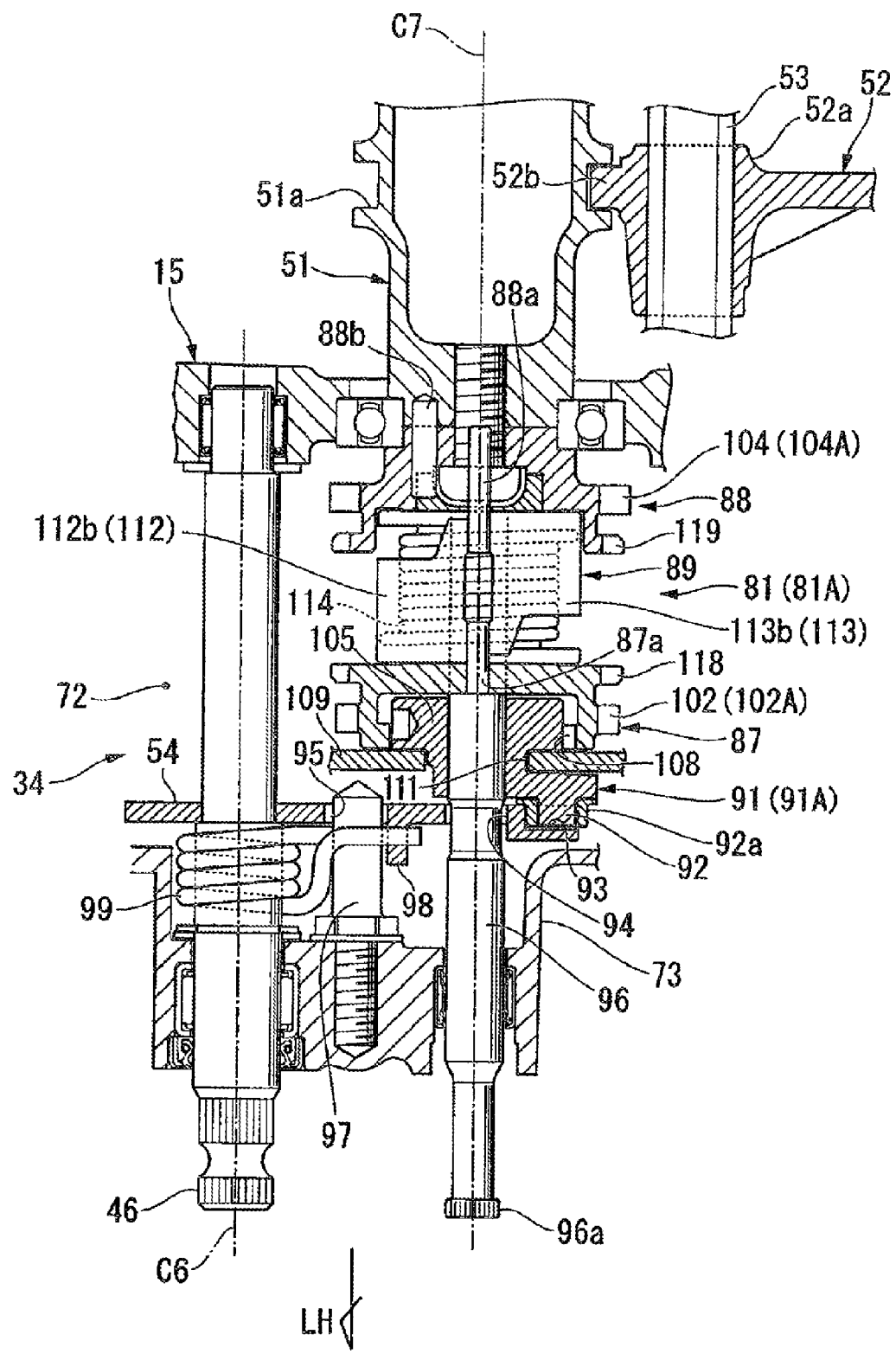
FIG. 8 is a front view with a partial cross section of a part of the engine.
Figure 9:
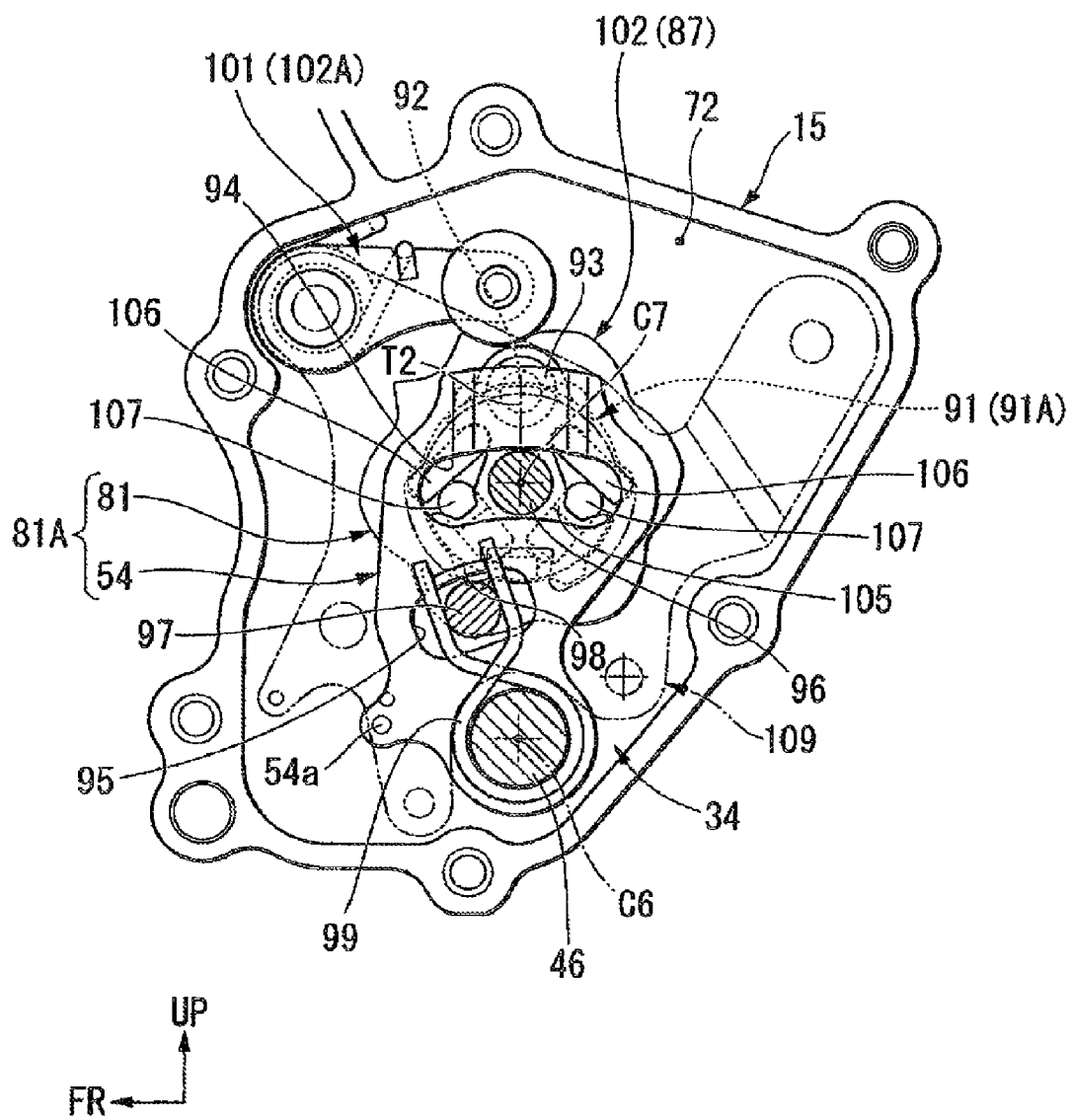
FIG. 9 is a left side view of a part of the engine.

To explain this embodiment in conjunction with FIG. 8 and FIG. 9, to a laterally intermediate portion of the shift spindle 46 which faces the inside of the crankcase 15 (the inside of the mechanism housing chamber 72), a proximal end portion of a plate-shaped shift arm 54 which approximately orthogonally intersects with the shift spindle 46 is fixed. The shift arm 54 extends toward the outside of the shift drum 51 located above the shift spindle 46, and the shift arm 54 and the shift drum 51 are engaged with each other by way of the power transmission mechanism 81. A manipulation power transmission mechanism 81A which transmits a shift manipulation force inputted to the shift spindle 46 to the shift drum 51 is mainly constituted of the shift arm 54, the power transmission mechanism 81 and a pawl ratchet mechanism 91A described later.

Figure 12:
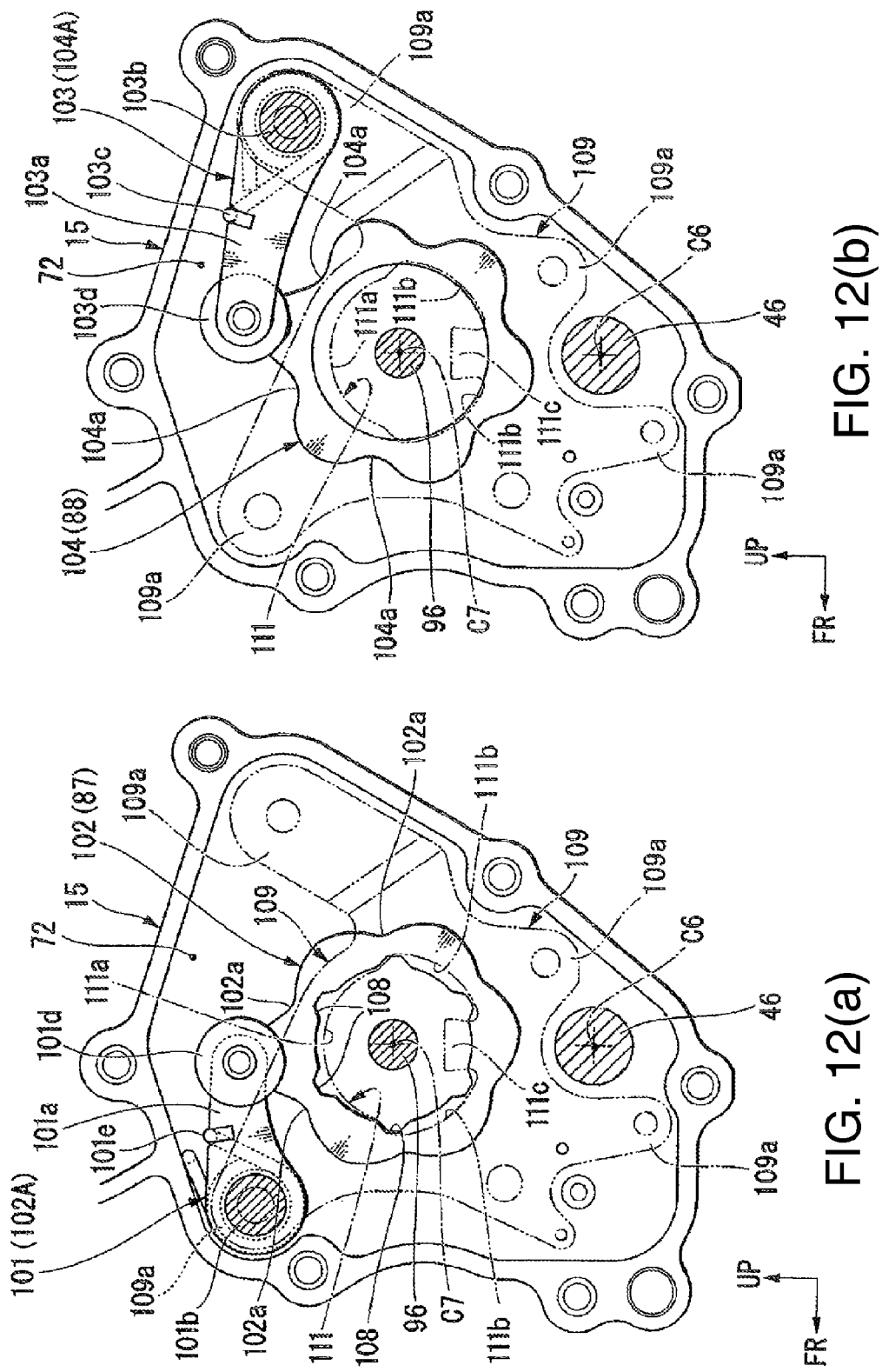
FIG. 12(*a*) is a left side view of a front drum stopper.

To explain this embodiment also in conjunction with FIG. 12, the power transmission mechanism 81 includes an annular shifter-side rotary member 87 and a drum-side rotary member 88 which are coaxial with the shift drum 51, and a lost motion mechanism 89 which is arranged between the respective rotary members 87, 88.

Hereinafter, the pawl ratchet mechanism 91A and the periphery of the pawl ratchet mechanism 91A are explained.

The shifter-side rotary member 87 has a cup shape which opens leftwardly, and a shifter assembled body 91 is arranged to be inserted into the inside of the shifter-side rotary member 87. The pawl ratchet mechanism 91A which converts one reciprocating rotational movement of the shift spindle 46 and the shift arm 54 into the rotational movement about the axis C7 over a predetermined angle is constituted of the shifter-side rotary member 87 and the shifter assembled body 91.

An engaging pin 92 is formed on a left side surface of the shifter assembled body 91 at a position offset from the axis C7 in a state where the engaging pin 92 projects leftwardly. A distal end portion of the shift arm 54 is positioned on a left side of the shifter assembled body 91, and the engaging pin 92 is engaged with the inside of a recessed portion 93 formed on the distal end portion of the shift arm 54 by way of a collar member 92a. A rotational force of the shift spindle 46 and the shift arm 54 is inputted to the shifter assembled body 91 by way of the recessed portion 93 and the engaging pin 92.

A guide hole 94 having a relatively-elongated arcuate shape around the axis C6 is formed on a distal end side of the shift arm 54, and an intermediate guide hole 95 having a relatively short arcuate shape around the axis C6 is formed on a front side of an intermediate portion of the shift arm 54. An intermediate portion of a transmission mechanism support shaft 96 which is coaxial with the shift drum 51 is inserted into the guide hole 94, and a distal end portion of a guide pin 97 which is mounted upright on an inner side of the left rear cover 73 is inserted into the intermediate guide hole 95.

Figure 10B:
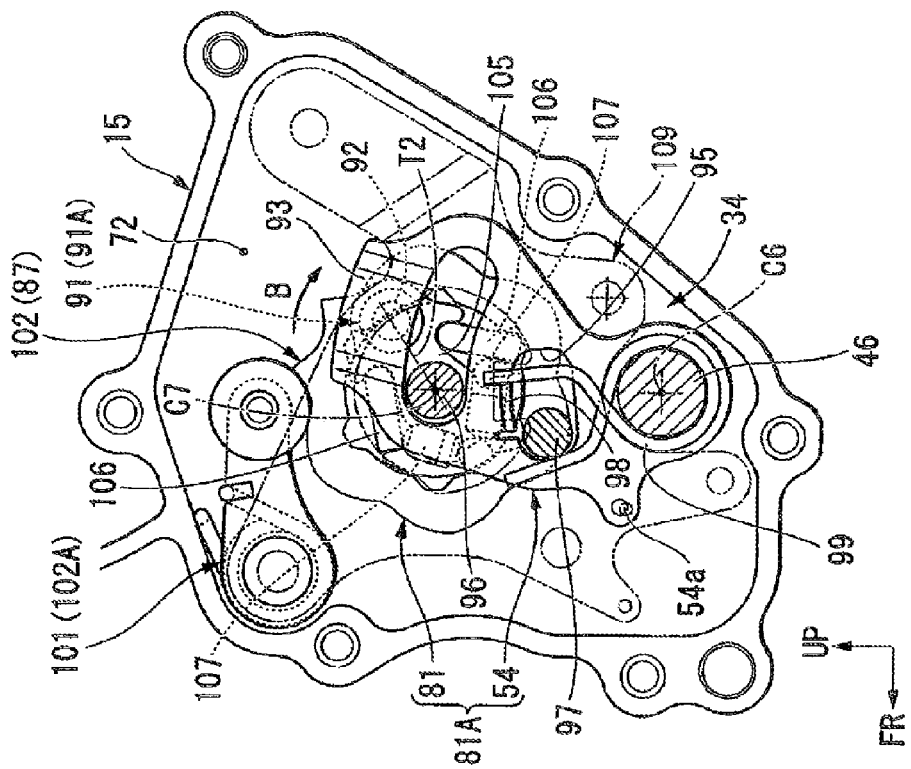
FIG. 10(*a*) is a left side view showing the structure corresponding to FIG. 9 in a shift-up manipulation.
Figure 10A:
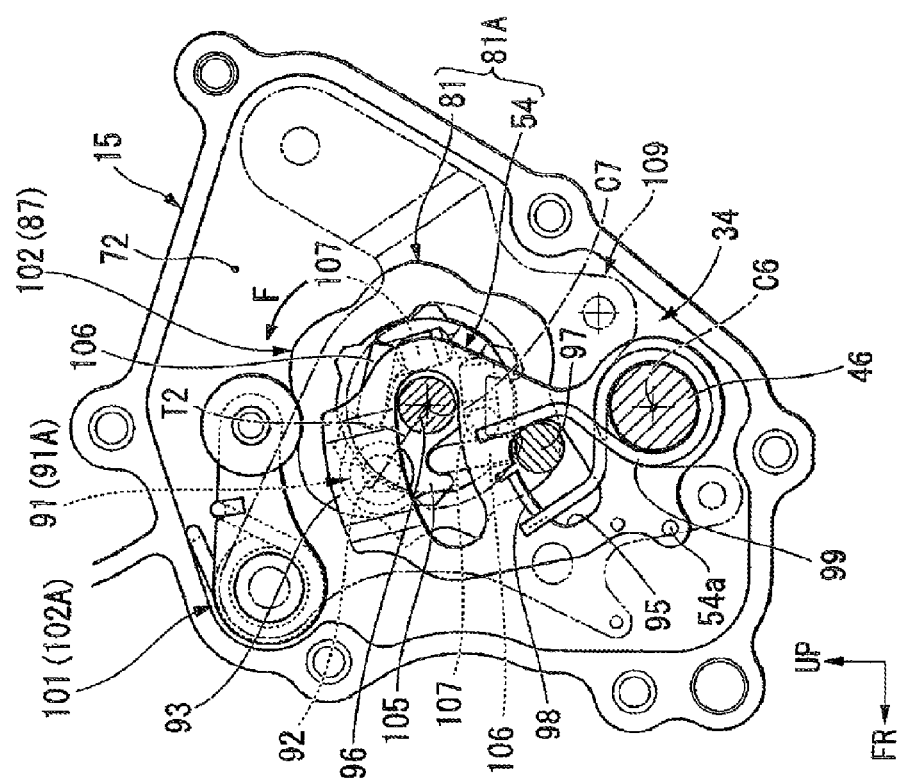

In a state where the shift arm 54 is at a rotation initial position at which the extending direction of the shift arm 54 is aligned with the vertical direction (see FIG. 9), the transmission mechanism support shaft 96 is positioned at a longitudinally center portion of the guide hole 94, and the guide pin 97 is positioned at a longitudinally center portion of the intermediate guide hole 95. Rotation angles of the shift arm 54 at the time of rotating the shift arm 54 from the rotation initial position in the forward direction and in the backward direction respectively (see FIG. 10(a), FIG. 10(b)) are restricted as the guide pin 97 is brought into contact with inner peripheries of both ends of the intermediate guide hole 95. In the drawings, arrows F, B respectively indicate the forward rotational direction (shift-up direction) and the backward rotational direction (shift-down direction) of the shift drum 51, the power transmission mechanism 81 and the like around the axis C7.

An engaging lug 98 which is raised toward leftwardly (outwardly) is formed on the shift arm 54 above the intermediate guide hole 95, and coil ends of a return spring 99 which is arranged adjacent to a left side (outer side) of a proximal end of the shift arm 54 are engaged with both sides of the engaging lug 98. The return spring 99 is a torsion coil spring in which the shift spindle 46 is inserted, and the guide pin 97 and the engaging lug 98 are clamped between both coil ends.

When the shift arm 54 is rotated either in the forward direction or in the backward direction from the rotation initial position, the engaging lug 98 and the guide pin 97 make the relative movement around the axis C6 so that both ends of the return spring 99 are spaced apart from each other thus generating a biasing force which acts to return the shift arm 54 toward the rotation initial position.

To explain this embodiment in conjunction with FIG. 9, FIG. 10, FIG. 12 and FIG. 13, a shifter-side stopper portion 102 which is engaged with a front stopper arm 101 supported on the crankcase 15 is integrally formed on an outer periphery of the shifter-side rotary member 87. A plurality of shifter-side outer peripheral recessed portions 102a which are arranged at intervals of a predetermined angle are formed on the shifter-side stopper portion 102. By engaging the front stopper arm 101 with any one of these shifter-side outer peripheral recessed portions 102a, the rotation of the shifter-side rotary member 87 is restricted at intervals of a predetermined angle. Hereinafter, the combination of the shifter-side stopper portion 102 and the front stopper arm 101 is referred to as a front drum stopper 102A.

With respect to the front stopper arm 101, a front end portion of an arm body 101a is swingably supported on a support shaft 101b which is fixedly mounted on the crankcase 15, and a rear end portion of the arm body 101a is biased toward the shifter-side rotary member 87 which is positioned below the arm body 101a by means of a torsion coil spring 101c in which the support shaft 101b is inserted, and a stopper roller 101d which is supported on an outer side of the rear end portion is engaged with a shifter-side outer peripheral recessed portion 102a. Accordingly, a predetermined rotation restricting force is applied to the shifter-side rotary member 87 at the predetermined rotational position, and the shifter-side rotary member 87 can be rotated with a rotational force which exceeds such a rotation restricting force.

To explain this embodiment in conjunction with FIG. 9, FIG. 10, the shifter assembled body 91 includes a shifter body 105 which is rotatable relative to the shifter-side rotary member 87, a pair of ratchet pawls 106 which are assembled to the shifter body 105, and a pair of plungers 107 which individually bias the respective ratchet pawls 106 to a shifter outer peripheral side.

To explain this embodiment also in conjunction with FIG. 8, a right side portion of the shifter body 105 is housed in the inside of the shifter-side rotary member 87 and a left side portion of the shifter body 105 which is spaced apart from the right side portion in the leftward direction projects toward a left side of the shifter-side rotary member 87. An intermediate portion of the power transmission mechanism support shaft 96 is inserted into a center portion of the shifter body 105 so that the shifter body 105 and the shifter-side rotary member 87 are connected to each other in a relatively rotatable manner. The engaging pin 92 is mounted on a left side surface of the shifter body 105 in a projecting manner.

The shifter body 105 is configured in line symmetry with respect to a straight line (shifter center line) T2 which connects an axis of the engaging pin 92 and an axis of the shifter body 105 (an axis of the power transmission mechanism support shaft 96) as viewed in a side view. Hereinafter, a position where the shifter center line T2 in the shifter body 105 (shifter assembled body 91) is aligned with the vertical direction is assumed as a shifter rotation initial position.

On both sides of the shifter body 105 which sandwich the shifter center line T2 therebetween, the respective ratchet pawls 106 are swingably held so as to move lower portions thereof toward the inside and the outside of the shifter body 105 about upper portions thereof. The respective ratchet pawls 106 are biased by the respective plungers 107 such that the lower portions of the ratchet pawls 106 project toward an outer periphery of the shifter body 105.

On the other hand, a plurality of inner peripheral recessed portions 108 are formed in the inside of the shifter-side rotary member 87 at intervals of a predetermined angle, and the lower portion of each ratchet pawl 106 is engageable with any one of the respective inner peripheral recessed portions 108 in a contacting manner In a state where the lower portion of the ratchet pawl 106 is engaged with the inner peripheral recessed portions 108 of the shifter-side rotary member 87, the relative rotation between the shifter-side rotary member 87 and the shifter assembled body 91 toward a side where the lower portion of each ratchet pawl 106 and the inner peripheral recessed portion 108 come into contact with each other is restricted, while the relative rotation between the shifter-side rotary member 87 and the shifter assembled body 91 toward a side opposite to the side where the lower portion of each ratchet pawl 106 and the inner peripheral recessed portion 108 come into contact with each other is allowed since the ratchet pawls 106 enter the inside of the shifter body 105.

To explain this embodiment also in conjunction with FIG. 12, between the shift arm 54 and the shifter-side rotary member 87, a guide plate 109 which has a planar shape orthogonal to the lateral direction and allows the shifter assembled body 91 to pass therethrough is arranged. An insertion hole 111 for the shifter assembled body 91 is formed in a center portion of the guide plate 109, and a plurality of stay portions 109a are formed on an outer peripheral side of the guide plate 109 for fastening the guide plate 109 to the crankcase 15.

The insertion hole 111 has a base diameter portion 111a having the substantially same diameter as a right side portion of the shifter body 105, a pair of enlarged-diameter portions 111b formed on both sides of a lower portion of the base diameter portion 111a, and a convex portion 111c formed between the respective enlarged-diameter portions 111b. With respect to the shifter assembled body 91 which is inserted into the insertion hole 111, lower portions of the ratchet pawls 106 which are positioned in the inside of the respective enlarged-diameter portions 111b are made to project toward the outside of the shifter body 105 so as to be engaged with the inner peripheral recessed portion 108 of the shifter-side rotary member 87. With respect to the ratchet pawls 106 positioned in the inside of the base diameter portion 111a, the lower portions of the ratchet pawls 106 get over an inner periphery of the base diameter portion 111a so that the lower portions enter the inside of the shifter body 105 thus preventing the lower portions of the ratchet pawls 106 from being engaged with the inner peripheral recessed portion 108 of the shifter-side rotary member 87.

The pawl ratchet mechanism 91A, when the shifter assembled body 91 is in the shifter rotation initial position (see FIG. 9), positions the respective ratchet pawls 106 within the respective enlarged-diameter portions 111b such that the ratchet pawls 106 are engageable with any one of the respective inner peripheral recessed portions 108 of the shifter-side rotary member 87. By engaging each ratchet pawl 106 with any one of the inner peripheral recessed portions 108, the relative rotation between the shifter assembled body 91 and the shifter-side rotary member 87 in both forward and backward directions is not allowed.

On the other hand, when the shifter assembled body 91 is rotated in one direction from the shifter rotation initial position together with the shifter-side rotary member 87 due to the rotation of the shift arm 54 (see FIG. 10), the ratchet pawl 106 on a side where the shifter assembled body 91 is rotated in the other direction gets over an inner periphery of the base diameter portion 111a of the guide plate 109 and enters the shifter body 105 so that the engagement of the ratchet pawl 106 with the inner peripheral recessed portion 108 is not allowed. Accordingly, the relative rotation of the shifter assembled body 91 in the other direction relative to the shifter-side rotary member 87 is allowed.

That is, after the shifter assembled body 91 and the shifter-side rotary member 87 are rotated in one direction, only the shifter assembled body 91 is allowed to be rotated (idling being allowed) in the other direction with respect to the shifter-side rotary member 87 whose rotation is restricted by the drum stopper 102A due to a cooperative operation with the guide plate 109. Here, the forward and backward rotations of the shifter assembled body 91 from the shifter rotation initial position are restricted within a predetermined angle since the guide pin 97 is brought into contact with the inner peripheries of both ends of the intermediate guide hole 95 formed in the shift arm 54. Further, the excessive rotation of the shifter-side rotary member 87 generated by inertia is restricted since the a lower portion of either one of the ratchet pawls 106 is brought into contact with a side end of the convex portion 111c of the guide plate 109.

Due to such reciprocating rotational movement of the shifter assembled body 91 in the forward and backward directions, the shifter-side rotary member 87 can be fed intermittently in the forward and backward rotational directions respectively. The rotation of the shifter-side rotary member 87 is transmitted to the drum-side rotary member 88 by way of the lost motion mechanism 89 so that the shift drum 51 is rotated together with the drum-side rotary member 88 by a predetermined angle whereby a shift position of the transmission 25 is changed one stage by one stage. That is, an angle that the shift drum 51 is rotated at a time due to intermittent feeding corresponds to an angle that the shift position of the transmission 25 is shifted up or shifted down by one stage.

The lost motion mechanism 89 and the periphery of the lost motion mechanism 89 are explained hereinafter.

To explain the lost motion mechanism 89 in conjunction with FIG. 8 and FIG. 10, the drum-side rotary member 88 has a cup shape which is opened leftwardly. A bottom portion of the drum-side rotary member 88 is fixed to a left end portion of the shift drum 51 by fastening, and a right end portion of the power transmission mechanism support shaft 96 which is coaxial with the shift drum 51 is inserted into the inside of the drum-side rotary member 88. A left end portion of the shift drum 51, the drum-side rotary member 88 and a right end portion of the power transmission mechanism support shaft 96 are engaged with each other in an integrally rotatable manner by way of a knock pin 88b which extends in the lateral direction. The drum-side rotary member 88 does not have the constitution corresponding to the inner peripheral recessed portions 108.

On an outer periphery of the drum-side rotary member 88, a drum-side stopper portion 104 with which a rear stopper arm 103 supported on the crankcase 15 is engaged is integrally formed. On the drum-side stopper portion 104, a plurality of drum-side outer peripheral recessed portions 104a which are arranged at intervals of a predetermined angle are formed. By engaging the rear stopper arm 103 with any one of the drum-side outer peripheral recessed portions 104a, the rotation of the drum-side rotary member 88 is restricted for every predetermined angle. Hereinafter, the combination of the drum-side stopper portion 104 and the rear stopper arm 103 is referred to as a rear drum stopper 104A.

Figure 13:
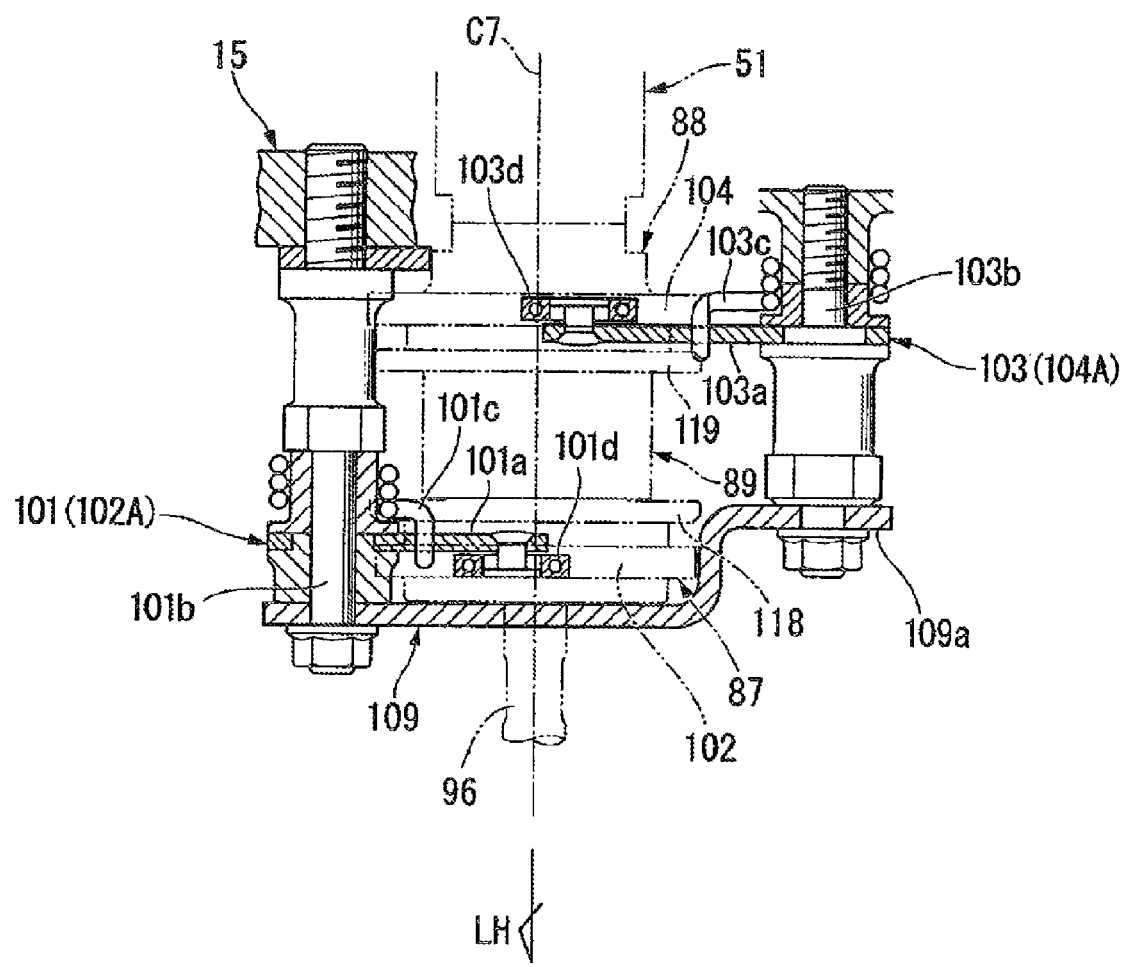
FIG. 13 is a planar cross-sectional view taken along a swing axis of the respective drum stoppers.

To explain the lost motion mechanism 89 also in conjunction with FIG. 13, a rear end portion of an arm body 103a of the rear stopper arm 103 is swingably supported on a support shaft 103b which is fixedly mounted on the crankcase 15, a front end portion of the arm body 103a is biased toward the drum-side rotary member 88 positioned below the arm body 103a by a torsion coil spring 103c which penetrates the support shaft 103b, and a stopper roller 103 d which is supported on an inner side of a rear end portion of the arm body 103a is engaged with the drum-side outer peripheral recessed portions 104a. Due to such a constitution, a rotation restricting force is applied to the drum-side rotary member 88 at a predetermined rotational position, and the drum-side rotary member 88 becomes rotatable with a rotational force which exceeds the rotation restricting force.

Figure 11:
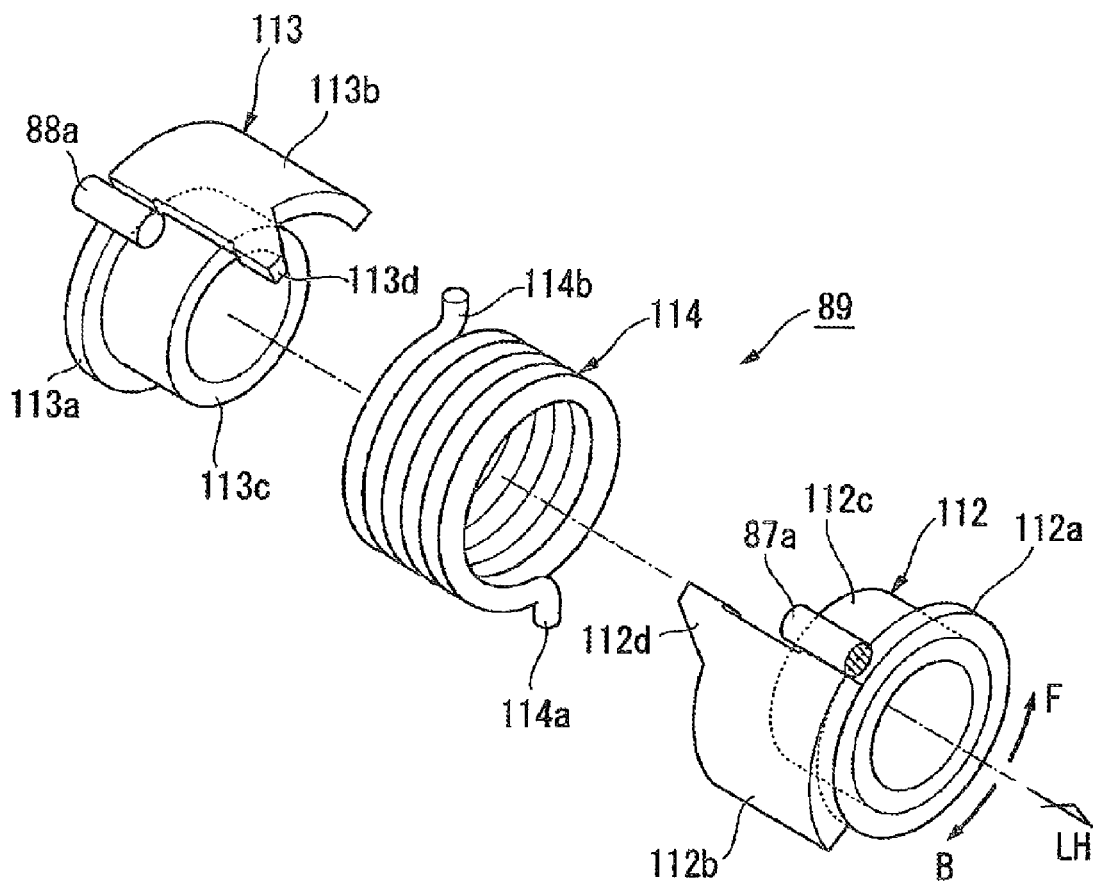
FIG. 11 is a exploded perspective view of a lost motion mechanism.

To explain the lost motion mechanism 89 in conjunction with FIG. 8 and FIG. 11, a lost motion spring 114 is held between the shifter-side guide member 112 and the drum-side guide member 113, the rotation of the shifter-side rotary member 87 is transmitted to the drum-side rotary member 88 by way of a resilient force of the lost motion spring 114, and when the shift spindle 46 is rotated in a state where the rotation of the drum-side rotary member 88 is restricted by a locking mechanism 82 described later, the rotational force can be accumulated in the lost motion spring 114.

Figure 15:
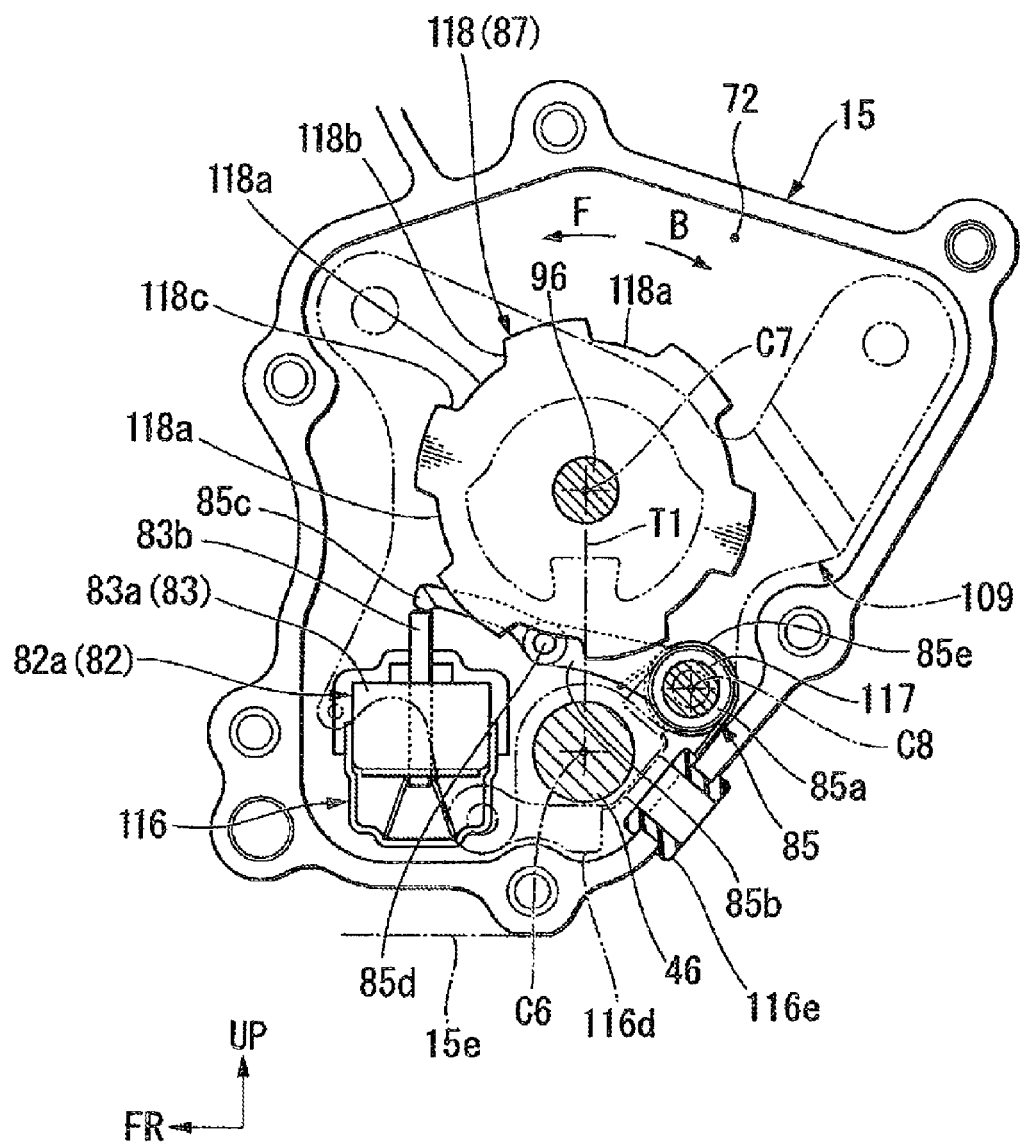
FIG. 15 is a left side view of a shifter-side locking mechanism.
Figure 16:
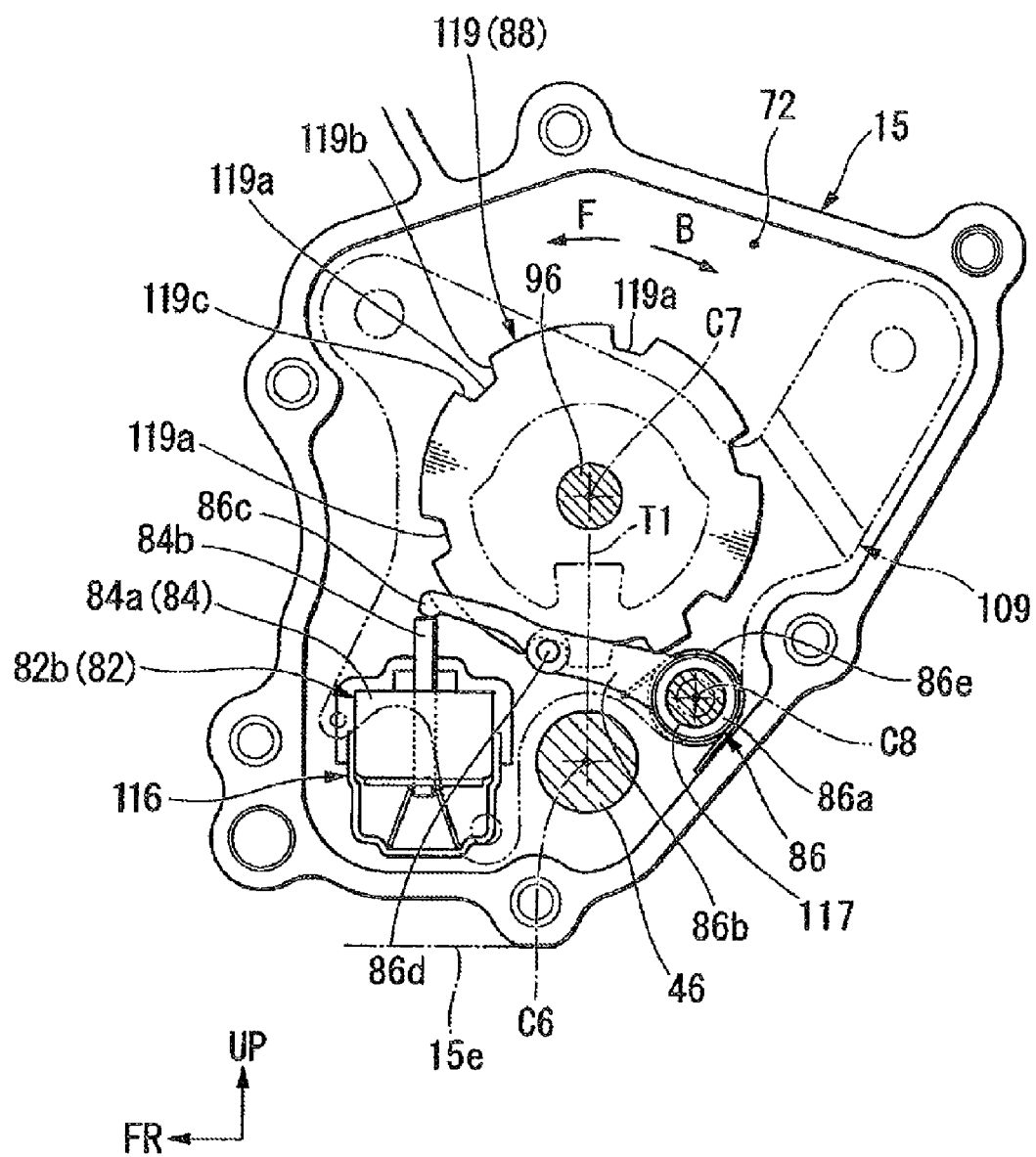
FIG. 16 is a left side view of a drum-side locking mechanism.

To explain the lost motion mechanism 89 in conjunction with FIG. 7, FIG. 15 and FIG. 16, the locking mechanism (manipulation force transmission switching means) 82 is provided for controlling timing of power transmission by the power transmission mechanism 81, and is mainly constituted of a pair of left and right solenoids 83, 84 which is arranged in front of the shift spindle 46 in the inside of the crankcase 15 (in the inside of the mechanism housing chamber 72) and a pair of left and right arms 85, 86 which are arranged directly above the shift spindle 46. The respective constitutions are described in detail later.

In a state where the rotational force is accumulated in the lost motion spring 114, when the ECU 59 determines that a rotation amount of the shift spindle 46 exceeds a predetermined amount by which a shift drum rotation amount necessary for changing a shift gear position can be ensured based on a detected signal from the shift spindle angle sensor 62, the locking mechanism 82 is operated so as to allow the rotation of the drum-side rotary member 88 and hence, the drum-side rotary member 88 and the shift drum 51 are rotated due to the accumulated rotational force whereby the shift position of the transmission 25 is changed.

To explain the lost motion mechanism 89 in conjunction with FIG. 8 and FIG. 11, the shifter-side guide member 112 includes a cylindrical outer sleeve 112a through which the power transmission mechanism support shaft 96 penetrates, a curved-plate-shaped shifter-side guide wall 112b which is raised upright toward an inner side (toward a shift drum 51 side) from a portion of the outer sleeve 112a within a predetermined range in the circumferential direction, and a cylindrical inner sleeve 112c which is disposed on an inner peripheral side of the outer sleeve 112a in a spaced-apart manner from the shifter-side guide wall 112b.

In the same manner, the drum-side guide member 113 includes a cylindrical outer sleeve 113a through which the power transmission mechanism support shaft 96 penetrates, a curved-plate-shaped drum-side guide wall 113b which is raised upright toward an outer side (toward a shift arm 54 side) from a portion of the outer sleeve 113a within a predetermined range in the circumferential direction, and a cylindrical inner sleeve 113c which is arranged on an inner peripheral side of the outer sleeve 113a in a spaced-apart manner from the drum-side guide wall 113b.

One coil end 114a of the lost motion spring 114 which is a torsion coil spring is engaged with a forward-rotational-direction downstream end of the shifter-side guide wall 112b, and the other coil end 114b of the lost motion spring 114 is engaged with a backward-rotational-direction downstream end of the drum-side guide wall 113b.

The lost motion spring 114 is held between the respective guide members 112, 113 in a state where both coil ends 114a, 114b are engaged with the respective guide walls 112b, 113b as describe previously, the inner sleeves 112c, 113c of the respective guide members 112, 113 are inserted into the inner peripheral side of the lost motion spring 114, and the lost motion spring 114 is covered with the respective guide walls 112b, 113b within a predetermined range of an outer peripheral side thereof. Here, due to a spring force of the lost motion spring 114, the shifter-side guide member 112 is biased in the backward rotational direction, and the drum-side rotary member 88 is biased in the forward rotational direction.

In assembling the lost motion spring 114 between the respective guide members 112, 113, although the assembling of the lost motion spring 114 is performed while twisting the lost motion spring 114, the respective guide walls 112b, 113b guide the lost motion spring 114 by covering the outer peripheral side of the lost motion spring 114 within a predetermined range and hence, the assembling operation can be easily performed.

On a raised-direction distal end portion of the shifter-side guide wall 112b, a shifter-side guide distal end portion 112d which projects inwardly (toward the shift drum 51 side) in a triangle shape as viewed in the radial direction is provided in a state where the shifter-side guide distal end portion 112d extends a backward-rotational-direction downstream end thereof. In the same manner, on a raised-direction distal end portion of the drum-side guide wall 113b, a drum-side guide distal end portion 113d which projects outwardly (toward the shift arm 54 side) in a triangle shape as viewed in the radial direction is formed in a state where the drum-side guide distal end portion 113d extends a forward-rotational-direction downstream end thereof.

A shifter-side guide pin 87a which is raised upright inwardly from the shifter-side rotary member 87 is engaged with the backward-rotational-direction downstream end of a raised-direction proximal end portion of the shifter-side guide wall 112b, and a drum-side guide pin 88a which is raised upright outwardly from the drum-side rotary member 88 is engaged with the forward-rotational-direction downstream end of a raised-direction proximal end portion of the drum-side guide wall 113b. A shifter-side guide pin 87a is sandwiched between the backward-rotational-direction downstream end on the proximal end side of the shifter-side guide wall 112b and the forward-rotational-direction downstream end of the drum-side guide distal end portion 113d, and the drum-side guide pin 88a is sandwiched between the forward-rotational-direction downstream end on the proximal end side of the drum-side guide wall 113b and the backward-rotational-direction downstream end of the shifter-side guide distal end portion 112d.

Due to such a constitution, during the forward rotation of the shifter-side rotary member 87, a rotational force is transmitted to the drum-side rotary member 88 by way of the shifter-side guide pin 87a, the shifter-side guide member 112, the lost motion spring 114, the drum-side guide member 113 and the drum-side guide pin 88a in this order. During the backward rotation of the shifter-side rotary member 87, a rotational force is transmitted to the drum-side rotary member 88 by way of the shifter-side guide pin 87a, the drum-side guide member 113, the lost motion spring 114, the shifter-side guide member 112 and the drum-side guide pin 88a in this order.

On the other hand, in the state where the rotation of the drum-side rotary member 88 is restricted by the locking mechanism 82, when the shifter-side rotary member 87 is rotated in the forward direction, only the shifter-side guide member 112 is rotated so that only a force necessary for rotating the drum-side guide member 113 and the drum-side rotary member 88 in the forward direction is accumulated in the lost motion spring 114. When the shifter-side rotary member 87 is rotated in the backward direction, only the drum-side guide member 113 is rotated so that only a force necessary for rotating the shifter-side guide member 112 and the drum-side rotary member 88 in the backward direction is accumulated in the lost motion spring 114.

By releasing the rotation restriction of the drum-side rotary member 88 which is made by the locking mechanism 82 at predetermined timing from such a state, it is possible to perform a shift change by rotating the drum-side rotary member 88 and the shift drum 51.

The locking mechanism 82 is explained in detail hereinafter.

To explain the locking mechanism 82 in conjunction with FIG. 7, FIG. 15 and FIG. 16, a left-side solenoid out of respective solenoids 83, 84 and a left-side arm out of respective arms 85, 86 (hereinafter referred to as the shifter-side solenoid 83 and the shifter-side arm 85 respectively, and the combination of these parts being referred to as a shifter-side locking mechanism 82a) allow the rotation of the shifter-side rotary member 87 until a rotation amount of the shift spindle 46 reaches the above-mentioned predetermined amount, and restricts the rotation of the shifter-side rotary member 87 when the rotation amount of the shift spindle 46 becomes the above-mentioned predetermined amount.

Further, a right-side solenoid out of respective solenoids 83, 84 and a right-side arm out of respective arms 85, 86 (hereinafter referred to as the drum-side solenoid 84 and the drum-side arm 86 respectively, and the combination of these parts being referred to as a drum-side locking mechanism 82b) restrict the rotation of the drum-side rotary member 88 in a state where the rotation of the shifter-side rotary member 87 is allowed (until the rotation amount of the shift spindle 46 reaches the predetermined amount), and allows the rotation of the drum-side rotary member 88 when the rotation of the shifter-side rotary member 87 is restricted (when the rotation amount of the shift spindle 46 reaches the predetermined amount).

These locking mechanisms 82a, 82b are individually engaged with or disengaged from the respective rotary members 87, 88 thus restricting or allowing the rotation of these rotary members 87, 88 individually.

The respective solenoids 83, 84 have a columnar shape and have center axes thereof arranged in the vertical direction respectively. The respective solenoids 83, 84 are stored in a state where the respective solenoids 83, 84 are disposed laterally in a single solenoid case 116 having a laterally elongated elliptical shape as viewed from above. A fixing screw shaft 116a for the crankcase 15 is formed on a right end portion of the solenoid case 116 in a projecting manner. On a left end portion of the solenoid case 116, a pair of front and rear engaging pins 116b corresponding to a lower side of a front portion of the guide plate 109 is formed in a projecting manner and, at the same time, a support shaft 116c of the rotary member 62c which constitutes a part of the shift spindle angle sensor 62 is mounted in a projecting manner.

In each solenoid 83, 84, a rod-shaped plunger 83b, 84b which is arranged vertically is inserted into and held in a center portion of each coil 83a, 84a in a stroke allowable state. Each plunger 83b, 84b is biased upwardly, and an upper end of the plunger 83b, 84b is brought into contact with a distal end portion 85c, 86c of the arm 85, 86 which corresponds to the plunger.

Rear end portions (proximal portions 85a, 86a) of the respective arms 85, 86 are supported on a pivot shaft 117 which is fixed to the crankcase 15 and extends in the lateral direction in a state where the rear end portions are inserted into the pivot shaft 117. The respective arms 85, 86 are swingable such that the front end sides of the arms 85, 86 are swingable vertically about the rear end portions thereof. In the drawing, symbol C8 indicates a center axis of the pivot shaft 117. The pivot shaft 117 is positioned below rear end portions of the respective rotary members 87, 88, and the respective solenoids 83, 84 are positioned below the front end portions of the respective rotary members 87, 88. Torsion coil springs 85e, 86e into which the pivot shaft 117 is inserted are arranged on rear end portions of the respective arms 85, 86. Due to spring forces of the respective springs 85e, 86e and the respective plungers 83b, 84e, the respective arms 85, 86 are biased such that the front end side of the respective arms 85, 86 are moved upward. The torsion coil springs 85e, 86e is formed of an integral double torsion coil spring.

The shifter-side arm 85 includes the cylindrical proximal portion 85a into which the pivot shaft 117 is inserted, the arm body 85b which extends frontwardly from a lateral inner side of the proximal portion 85a, and a distal end portion 85c which is raised toward a lateral outer side from a front end portion of the arm body 85b. An engaging pin 85d which is engaged with a shifter-side engaging portion 118 of the shifter-side rotary member 87 positioned above the arm body 85b is mounted on a longitudinally-intermediate portion of the arm body 85b in a projecting manner.

The engaging pin 85d is only resiliently engaged with a shifter-side engaging recessed portion 118a of the shifter-side engaging portion 118 when the shifter-side solenoid 83 is not energized, and when a predetermined or more rotational force acts, the engaging pin 85d gets over a side end of the shifter-side engaging recessed portion 118a and allows the rotation of the shifter-side rotary member 87. On the other hand, when the shifter-side solenoid 83 is energized so that the plunger 83b is fixedly held in an elevated state, the engaging pin 85d does not get over the side end of the shifter-side engaging recessed portion 118a so that the rotation of the shifter-side rotary member 87 is locked.

In the same manner, the drum-side arm 86 includes the cylindrical proximal portion 86a into which the pivot shaft 117 is inserted, the arm body 86b which extends frontwardly from a lateral outer side of the proximal portion 86a, and a distal end portion 86c which is raised toward a lateral inner side from a front end portion of the arm body 86b. An engaging pin 86d which is engaged with a drum engaging portion of the drum-side rotary member 88 positioned above the arm body 86b is mounted on a longitudinally-intermediate portion of the arm body 86b in a projecting manner.

The engaging pin 86d is only resiliently engaged with a drum-side engaging recessed portion 119a of the drum-side engaging portion 119 when the drum-side solenoid 84 is not energized, and when a predetermined rotational force or more acts, the engaging pin 86d gets over a side end of the drum-side engaging recessed portion 119a and allows the rotation of the drum-side rotary member 88. On the other hand, when the drum-side solenoid 84 is energized so that the plunger 84b is fixedly held in an elevated state, the engaging pin 86d does not get over the side end of the drum-side engaging recessed portion 119a so that the rotation of the drum-side rotary member 88 is locked.

On a portion of an outer periphery of the shifter-side rotary member 87 which is positioned on a more lateral inner side (lost motion mechanism 89 side) than the shifter-side stopper portion 102, the shifter-side engaging portion 118 with which the engaging pin 85d of the shifter-side arm 85 is engaged is integrally formed. A plurality of shifter-side engaging recessed portions 118a which are arranged at intervals of a predetermined angle are formed on the shifter-side engaging portion 118. By engaging the engaging pin 85d of the shifter-side arm 85 with any one of the shifter-side engaging recessed portion 118a, the rotation of the shifter-side rotary member 87 is restricted for every predetermined angle. In the drawing, symbol indicates retainers which are disposed along wall portions of the portions which are provided for guiding lines extending from the respective solenoids 83, 84 to wiring takeout holes formed on a rear side of a lower portion of the mechanism housing chamber 72.

In the same manner, on a portion of an outer periphery of the drum-side rotary member 88 which is positioned on a more lateral outer side (lost motion mechanism 89 side) than the drum-side stopper portion 104, the drum-side engaging portion 119 with which the engaging pin 86d of the drum-side arm 86 is engaged is integrally formed. A plurality of drum-side engaging recessed portion 119a which are located at intervals of a predetermined angle are formed on the drum-side engaging portion 119. By engaging the engaging pin 86d of the drum-side arm 86 of the drum-side locking mechanism 82b with any one of the drum-side engaging recessed portions 119a, the rotation of the drum-side rotary member 88 is restricted for every predetermined angle.

The shifter-side engaging recessed portion 118a is engaged with the engaging pin 85d with a larger play in the circumferential direction than the drum-side engaging recessed portion 119a. Further, in each engaging recessed portion 118a, 119a, by setting the inclination of the side end 118b, 119b on a forward-rotational-direction downstream side (shift-up side) with respect to the radial direction larger than the inclination of the side end 118c, 119c on a backward-rotational-direction downstream side (shift-down side) with respect to the radial direction, the structure contributes to the enhancement of operability in a shift-up operation which requires a relatively small manipulation force compared to a shift-down operation.

Here, the respective solenoids 83, 84 and the respective arms 85, 86 are arranged in front of a straight line T1 which connects the respective center axes (respective axes C7, C6) of the shift drum 51 and the shift spindle 46 arranged vertically as viewed in a side view, and are arranged above a split face 15e between the crankcase 15 and the oil pan 15c. The respective arms 85, 86 are arranged to extend longitudinally between the shift spindle 46 and the shift drum 51 as viewed in a side view.

Further, the center of rotation (axis C8, fulcrum) of rear ends of the respective arms 85, 86 is positioned behind the above-mentioned straight line T1 as viewed in a side view. Contact points (distal end portions 85c, 86c, input points) of front ends of the respective arms 85, 86 with the respective solenoids 83, 84 are located in front of the straight line T1 as viewed in a side view. Engaging points (engaging pins 85d, 86d, points of action) of intermediate portions of the respective arms 85, 86 with the respective rotary members 87, 88 are positioned directly in front of the straight line T1 (approximately at the center between the above-mentioned center of rotation and the contact points) as viewed in a side view. In FIG. 15, symbol 116d indicates a retainer which guides lines extending from the respective solenoids 83, 84 in the inside of the mechanism housing chamber 72, and symbol 116e indicates a grommet mounted on a leading hole for pulling out the above-mentioned lines.

Hereinafter, the shift spindle angle sensor 62 and the gear position sensor 61 will be described.

Figure 14:
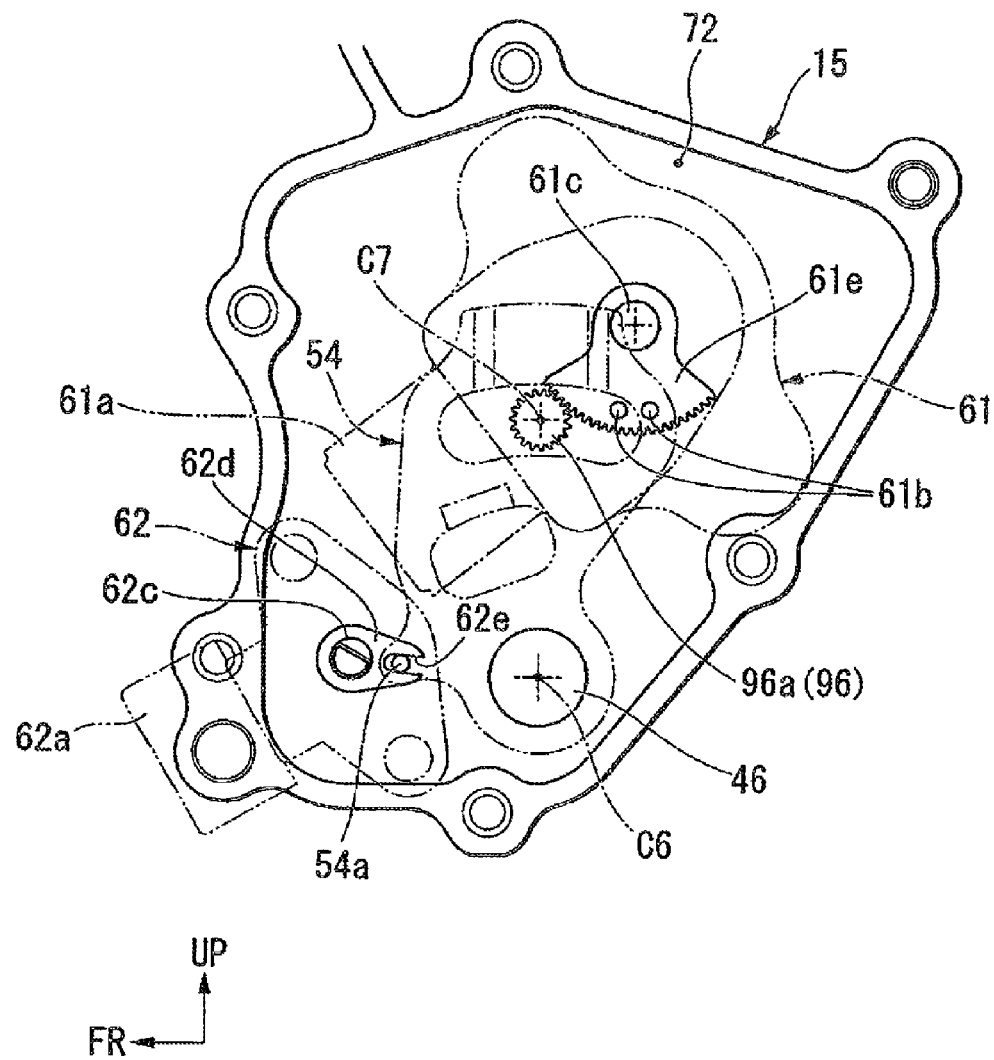
FIG. 14 is a left side view of driving part of a gear position sensor and a shift spindle angle sensor.

To explain the shift spindle angle sensor 62 and the gear position sensor 61 in conjunction with FIG. 6, FIG. 7 and FIG. 14, the shift spindle sensor 62 is located outwardly from the respective solenoids 83, 84 and outside the left rear cover 73. The shift spindle angle sensor 62 detects a rotation angle of the shift spindle 46 based on a rotation amount of a rotary shaft 62b which is held in the inside of the housing and extends in the lateral direction. A distal end portion of a rotary member 62c which penetrates the left rear cover 73 from the inside of the left rear cover 73 is engaged with an inner end of the rotary shaft 62b in an integrally rotatable manner. The rotary member 62c is supported on a support shaft 116c which is mounted on an outer end of the solenoid case 116 in a projecting manner and extends in the lateral direction in a state where the rotary member 62c is rotatable about an axis of the support shaft 116c.

A plate-shaped portion 62d which has an elliptical shape as viewed in a side view and extends rearwardly is integrally formed on an inner end of the rotary member 62c. An engaging pin 54a which is raised upright toward the inside in the lateral direction from a front side of a proximal end of the shift arm 54 is engaged with the inside of a notch 62e which is formed on a rear portion of the plate-shaped portion 62d and is opened rearward. Due to such a constitution, when the shift arm 54 is rotated together with the shift spindle 46, the rotary shaft 62b of the shift spindle angle sensor 62 is rotated by way of the rotary member 62c, and a rotation angle of the shift spindle 46 can be detected based on a rotation amount of the rotary shaft 62b.

Further, the gear position sensor 61 detects a rotation angle of the shift drum 51 (power transmission mechanism support shaft 96) based on a rotation amount of a rotor not shown in the drawing which is held in the inside of a housing of the gear position sensor 61. A pair of engaging pins 61b which project outwardly from the rotary member 61c held by the drive sprocket cover 74 is engaged with an inner portion of the rotor. The rotary member 61c is supported by a holding hole 61d which is formed in the drive sprocket cover 74 and extends in the lateral direction in a rotatable manner about an axis thereof.

A sector gear 61e which extends obliquely in the frontward and downward direction in a fan shape as viewed in a side view is integrally mounted on an outer end of the rotary member 61c. A pinion gear 96a which is formed on an outer end of the power transmission mechanism support shaft 96 is meshed with gear teeth formed on a distal end of the sector gear 61e. Due to such a constitution, when the power transmission mechanism support shaft 96 is rotated together with the shift drum 51, the rotor of the gear position sensor 61 is rotated by way of the rotary member 61c and hence, a rotation angle of the shift drum 51 and, eventually, a shift position of the transmission 25 can be detected based on a rotation amount.

Next, the manner of operation of this embodiment is explained.

Firstly, in a state where a shift manipulation of the transmission 25 is not performed so that the respective engaging pins 85d, 86d of the respective arms 85, 86 are engaged with the respective engagement recessed portions 118a, 119a (see FIG. 15 and FIG. 16), the shifter-side solenoid 83 is in a non-energized state, and the drum-side solenoid 84 is in an energized state (or both solenoids 83, 84 being in a non-energized state).

For example, when the shift pedal 47 is manipulated toward a shift-up side from such a state so that the shift spindle 46 and the shift arm 54 are rotated toward a shift-up side, the shifter-side rotary member 87 starts to rotate in the forward direction by way of the pawl ratchet mechanism 91A (see FIG. 10).

Since the shifter-side solenoid 83 is in a non-energized state and the drum-side solenoid 84 is in an energized state, the engaging pin 85d of the shifter-side arm 85 gets over the side end of the shifter-side engaging recessed portion 118a with a predetermined rotational force so that the rotation of the shifter-side rotary member 87 is allowed, while the plunger 84b is fixedly held in an elevated state so that the rotation of the drum-side rotary member 88 is locked (see FIG. 17(a) and FIG. 18(a)). Due to the relative rotation between the respective rotary members 87, 88, a force which rotates the shift drum 51 is accumulated in the lost motion mechanism 89.

The rotation of the shift spindle 46 is detected by the ECU 59 by way of the shift spindle angle sensor 62. When the ECU 59 determines that the rotational angle of the shift spindle 46 reaches the above-mentioned predetermined value, in other words, when the ECU 59 determines that a force which can ensure a rotation amount of the shift drum 51 which is necessary for changing the shift gear position is accumulated in the lost motion mechanism 89, the ECU 59 switches energy states of the respective solenoids 83, 84 such that the shifter-side solenoid 83 is brought into an energized state, and the drum-side solenoid 84 is brought into a non-energized state (see FIG. 17(b) and FIG. 18(b)).

Then, the plunger 83b is fixedly held in an elevated state so that the rotation of the shifter-side rotary member 87 is locked, while the engaging pin 86d of the drum-side arm 86 gets over the side end of the drum-side engaging recessed portion 119a with a predetermined rotational force so that the rotation of the drum-side rotary member 88 is allowed (see FIG. 17(c) and FIG. 18(c)). Here, the drum-side rotary member 88 and the shift drum 51 are rotated by making use of a rotational force accumulated in the lost motion mechanism 89.

The rotation of the shift drum 51 is detected by the ECU 59 by way of the gear position sensor 61. When the ECU 59 determines that the shift change is completed, the ECU 59 switches the energy states of the respective solenoids 83, 84 so that the respective solenoids 83, 84 are returned to a state before the shift manipulation where the shifter-side solenoid 83 is in a non-energized state and the drum-side solenoid 84 is in an energized state (see FIG. 17(d) and FIG. 18(d)).

In this manner, by accumulating the force which is necessary for changing over the shift gear position in the lost motion mechanism 89 and, thereafter, by rotating the shift drum 51 by releasing the accumulated force, the reliability of a shift change and feeling of shift manipulation in a semiautomatic mode can be enhanced.

Further, the shift control device also possesses additional functions including a function which prevents an unintended operation of the change mechanism 34 due to an inadvertent external force (caused by a manipulation of a rider such as touching the shift pedal 47 unconsciously, for example).

As has been explained heretofore, with respect to the shift control device of the saddle-ride-type vehicle of this embodiment, in the shift control device which includes the engine 13 and the transmission 25 and is applied to the motorcycle 1, the transmission 25 includes the shift spindle 46 which is rotated due to the external force for shifting, and the shift drum 51 which is intermittently rotated corresponding to the rotation of the shift spindle 46 so as to operate the shift fork 52 thereby performing the selection of the shift gear, the shift control device includes the lost motion mechanism 89 which is arranged between the shift spindle 46 and the shift drum 51 and engages the shifter-side rotary member 87 on the shift spindle 46 side and the drum-side rotary member 88 on the shift drum 51 side with each other in the relatively rotatable manner while accumulating a force, and the locking mechanism 82 which is engaged with the shifter-side rotary member 87 and the drum-side rotary member 88 respectively so as to restrict the rotation of the shifter-side rotary member 87 and the rotation of the drum-side rotary member 88 individually.

Due to such a constitution, by restricting the rotation of one of the respective rotary members 87, 88 and, at the same time, allowing the rotation of the other of the respective rotary members 87, 88 by the locking mechanism 82, a shift manipulation force is accumulated by causing the relative rotation between the respective rotary members 87, 88, and the shift drum 51 is rotated by releasing this force at predetermined timing and hence, shift start timing can be surely controlled and, at the same time, it is possible to surely make an accumulated force act until the completion of shifting.

In the shift control device of the saddle-ride-type vehicle, the locking mechanism 82 includes: the shifter-side solenoid 83 which allows the rotation of the shifter-side rotary member 87 until the rotation amount of the shift spindle 46 reaches the predetermined amount by which a rotation amount of the shift drum 51 necessary for changing a shift gear position of the transmission 25 can be ensured, and restricts the rotation of the shifter-side rotary member 87 when the rotation amount of the shift spindle 46 becomes the predetermined amount; and the drum-side solenoid 84 which restricts the rotation of the drum-side rotary member 88 in the state where the rotation of the shifter-side rotary member 87 is allowed, and allows the rotation of the drum-side rotary member 88 when the rotation of the shifter-side rotary member 87 is restricted.

Due to such a constitution, it is possible to allow the lost motion mechanism 89 to accumulate a shift manipulation force with the simple structure that the rotations of the respective rotary members 87, 88 are allowed or restricted by the respective solenoids 83, 84, and this force is released after completion of rotation of the shifter-side rotary member 87 so that the drum-side rotary member 88 and the shift drum 51 can be rotated whereby the reliability of a shift change and feeling of shift manipulation can be enhanced.

In the shift control device of the saddle-ride-type vehicle, the respective rotary members 87, 88 are arranged coaxially with each other, and the lost motion mechanism 89 includes: the shifter-side guide member 112 which is engaged with the respective rotary members 87, 88 in the integrally rotatable manner when the respective rotary members 87, 88 are rotated in the forward direction; the drum-side guide member 113 which is engaged with the respective rotary members 87, 88 in the integrally rotatable manner when the respective rotary members 87, 88 are rotated in the backward direction; and the lost motion spring 114 which is held between the respective guide members 112, 113, biases the shifter-side guide member 112 in the backward rotational direction, and biases the drum-side guide member 113 in the forward rotational direction.

Due to such a constitution, a rotational force is transmitted to the drum-side rotary member 88 in order of the shifter-side guide member 112, the lost motion spring 114 and the drum-side guide member 113 during the forward rotation of the shifter-side rotary member 87, while the rotational force is transmitted to the drum-side rotary member 88 in order of the drum-side guide member 113, the lost motion spring 114 and the shifter-side guide member 112 during the backward rotation of the shifter-side rotary member 87. Here, when the rotation of the drum-side rotary member 88 is restricted, during the forward rotation of the shifter-side rotary member 87, only the shifter-side guide member 112 is rotated so that a force which rotates the drum-side guide member 113 and the drum-side rotary member 88 in the forward direction is accumulated in the lost motion spring 114, while during the backward rotation of the shifter-side rotary member 87, only the drum-side guide member 113 is rotated so that a force which rotates the shifter-side guide member 112 and the drum-side rotary member 88 in the backward direction is accumulated in the lost motion spring 114. Then, by releasing the rotation restriction of the drum-side rotary member 88 at predetermined timing, the drum-side rotary member 88 and the shift drum 51 are rotated so that a shift change can be performed. In this manner, it is possible to realize the accumulation means which accumulates a rotational force of the shift drum 51 with the simple constitution.

In the shift control device of the saddle-ride-type vehicle, the shift spindle 46 and the shift drum 51 are arranged in the lateral direction, and the respective solenoids 83, 84 are arranged in front of the straight line T1 which connects respective axes C6, C7 of the shift spindle 46 and the shift drum 51 as viewed in the side view.

Due to such a constitution, by disposing the respective solenoids 83, 84 in the space which has a relatively sufficient space for layout in front of the shift spindle 46 and the shift drum 51, it is possible to provide a compact engine layout by which it is unnecessary to additionally ensure spaces for arranging the respective solenoids 83, 84.

In the shift control device of the saddle-ride-type vehicle, the respective solenoids 83, 84 are housed in one solenoid case 116, and the support shaft 116c of the shift spindle angle sensor 62 is mounted on the solenoid case 116 in the projecting manner.

Due to such a constitution, it is possible to constitute the shift spindle angle sensor 62 using the small number of parts.

The present invention is not limited to the above-mentioned embodiment, and is also applicable to a vehicle having the constitution in which an engine (crankcase) and a transmission (transmission case) are formed as separate bodies, for example.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A shift control device of a saddle-ride-type vehicle having an engine and a transmission, wherein the transmission includes a shift spindle which is rotated due to an external force for shifting, and a shift drum which is intermittently rotated corresponding to the rotation of the shift spindle, so as to operate a shift fork and thereby performing the selection of a shift gear, said shift control device comprising:
   a lost motion mechanism disposed between the shift spindle and the shift drum, and which engages an upstream-side rotary member on a shift spindle side thereof, and a downstream-side rotary member on a shift drum side thereof, in a relatively rotatable manner while accumulating a force, and
   a locking mechanism engaged with said upstream-side rotary member and said downstream-side rotary member, respectively, so as to restrict the rotation of said upstream-side rotary member and the rotation of said downstream-side rotary member individually.

2. The shift control device of a saddle-ride-type vehicle of claim 1, said locking mechanism comprising:
   an upstream-side solenoid which allows the rotation of said upstream-side rotary member until a rotation amount of the shift spindle reaches a predetermined amount by which a rotation amount of the shift drum necessary for changing a shift gear position of the transmission can be ensured and restricts the rotation of said upstream-side rotary member when the rotation amount of the shift spindle becomes the predetermined amount; and
   a downstream-side solenoid which restricts the rotation of said downstream-side rotary member in a state where the rotation of said upstream-side rotary member is allowed, and allows the rotation of said downstream-side rotary member when the rotation of said upstream-side rotary member is restricted.

3. The shift control device of a saddle-ride-type vehicle of claim 1, wherein
   said respective rotary members are disposed coaxially with one another, and
   said lost motion mechanism including,
      a first guide member engaged with said rotary members in an integrally rotatable manner when said rotary members are rotated in a forward direction,
      a second guide member engaged with said rotary members in an integrally rotatable manner when said rotary members are rotated in a backward direction, and
      a lost motion spring, held between said guide members, which biases said first guide member in the backward rotational direction, and biases said second guide member in the forward rotational direction.

4. The shift control device of a saddle-ride-type vehicle of claim 2, wherein
   said respective rotary members are disposed coaxially with one another, and
   said lost motion mechanism including,
      a first guide member engaged with said rotary members in an integrally rotatable manner when said rotary members are rotated in a forward direction,
      a second guide member engaged with said rotary members in an integrally rotatable manner when said rotary members are rotated in a backward direction, and
      a lost motion spring, held between said guide members, which biases said first guide member in the backward rotational direction, and biases said second guide member in the forward rotational direction.

5. The shift control device of a saddle-ride-type vehicle of claim 2, wherein the shift spindle and the shift drum are disposed in a lateral direction, and
   said solenoids are located in front of a straight line which connects respective axes of the shift spindle and the shift drum, as viewed in a side view.

6. The shift control device of a saddle-ride-type vehicle of claim 2, wherein said solenoids are housed in one case, and a pivot portion of a shift spindle angle sensor is mounted on said case in a projecting manner.

7. The shift control device of a saddle-ride-type vehicle of claim 4, wherein said solenoids are housed in one case, and a pivot portion of a shift spindle angle sensor is mounted on said case in a projecting manner.

* * * * *